US010609751B2

(12) United States Patent
Lu et al.

(10) Patent No.: US 10,609,751 B2
(45) Date of Patent: Mar. 31, 2020

(54) METHOD AND APPARATUS FOR CONNECTION PROCESSING BETWEEN A TERMINAL AND BASE STATION

(71) Applicant: ZTE CORPORATION, Guangdong (CN)

(72) Inventors: Ting Lu, Guangdong (CN); Yuanfang Yu, Guangdong (CN); Yin Gao, Guangdong (CN); Xiubin Sha, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/074,067

(22) PCT Filed: Feb. 4, 2017

(86) PCT No.: PCT/CN2017/072872
§ 371 (c)(1),
(2) Date: Jul. 30, 2018

(87) PCT Pub. No.: WO2017/133678
PCT Pub. Date: Aug. 10, 2017

(65) Prior Publication Data
US 2019/0045570 A1    Feb. 7, 2019

(30) Foreign Application Priority Data

Feb. 5, 2016   (CN) .......................... 2016 1 0082768
Feb. 26, 2016  (CN) .......................... 2016 1 0113478

(51) Int. Cl.
*H04W 76/18*     (2018.01)
*H04W 76/27*     (2018.01)
(Continued)

(52) U.S. Cl.
CPC ....... *H04W 76/18* (2018.02); *H04W 74/0833* (2013.01); *H04W 76/27* (2018.02);
(Continued)

(58) Field of Classification Search
CPC ..... H04W 76/18; H04W 76/19; H04W 76/11; H04W 74/0833; H04W 88/023;
(Continued)

(56) References Cited

U.S. PATENT DOCUMENTS

2010/0105386 A1*  4/2010  Guo .................. H04W 8/26
                                                    455/435.1
2012/0201228 A1*  8/2012  Wu ................... H04W 76/19
                                                    370/336
(Continued)

FOREIGN PATENT DOCUMENTS

CN    101374331 A     2/2009
CN    101888684 A    11/2010
(Continued)

OTHER PUBLICATIONS

Partial Supplemental European Search Report dated Nov. 6, 2018, in corresponding European Application No. 17745998.8.
(Continued)

*Primary Examiner* — Jung Liu
(74) *Attorney, Agent, or Firm* — Duane Morris LLP

(57) ABSTRACT

The present invention provides a method and apparatus for connection processing between a terminal and base station, wherein, the method comprises: the base station receiving the first request message carrying the terminal identity information that is transmitted by the terminal, wherein, the terminal identity information is used to indicate the identity of the terminal, and the first request message is used to request the base station to resume the connection between the terminal and network; the base station searches for
(Continued)

context information matching the terminal identity information; when the base station finds the context information, it uses the context information to resume the connection with the terminal. Adopting the technical solutions provided by the present embodiments solves the problem of complex connection processing between the terminal and network in the related art, and achieves high-speed connection resumption between a terminal and network.

13 Claims, 19 Drawing Sheets

(51) Int. Cl.
*H04W 74/08* (2009.01)
*H04W 88/02* (2009.01)
*H04W 76/19* (2018.01)
*H04W 80/02* (2009.01)
*H04W 4/70* (2018.01)
*H04W 76/11* (2018.01)
*H04W 80/08* (2009.01)

(52) U.S. Cl.
CPC ............ *H04W 88/023* (2013.01); *H04W 4/70* (2018.02); *H04W 76/11* (2018.02); *H04W 76/19* (2018.02); *H04W 80/02* (2013.01); *H04W 80/08* (2013.01)

(58) Field of Classification Search
CPC ..... H04W 76/27; H04W 80/08; H04W 80/02; H04W 4/70; H04W 74/00; H04W 88/14; H04W 88/005; H04W 8/26; H04W 36/10; H04W 36/0033; H04L 61/1588
See application file for complete search history.

(56) References Cited

U.S. PATENT DOCUMENTS

| | | |
|---|---|---|
| 2013/0039339 A1 | 2/2013 | Rayavarapu et al. |
| 2013/0260740 A1* | 10/2013 | Rayavarapu .......... H04W 76/27 455/422.1 |
| 2013/0260810 A1* | 10/2013 | Rayavarapu .......... H04W 76/19 455/509 |
| 2013/0260811 A1* | 10/2013 | Rayavarapu .......... H04W 76/19 455/509 |
| 2015/0245405 A1* | 8/2015 | Johansson ............. H04W 76/18 370/228 |
| 2018/0035420 A1* | 2/2018 | Centonza ............. H04W 72/048 |
| 2019/0037459 A1* | 1/2019 | Pelletier ................ H04W 76/27 |
| 2019/0045572 A1* | 2/2019 | Kim ....................... H04W 76/19 |

FOREIGN PATENT DOCUMENTS

| | | |
|---|---|---|
| CN | 102340886 A | 2/2012 |
| CN | 102685895 A | 9/2012 |
| CN | 103858512 A | 6/2014 |
| EP | 2675081 B1 | 5/2018 |
| EP | 3383125 A1 | 10/2018 |

OTHER PUBLICATIONS

NTT Docomo, Inc., "Further analysis of supporting UP solution by existing RR states and procedures", 3GPP TSG-RAN WG2 NB-IoT Ad-hoc Meeting, Jan. 2016, Budapest, Hungary, R2-160419, 9 pages.

ZTE, "Further discussion on UP solution", 3GPP TSG-RAN WG2 Meeting #93, St. Julian's, Malta, Feb. 2016, R2-161393, 4 pages.

International Search Report dated Apr. 27, 2017, in corresponding International Application No. PCT/CN2017/072872.

Search Report dated Aug. 30, 2019, in priority application No. CN2016101134784.

LG Electronics, "MM procedure handling for CIoT UP Optimization," SA WG2 Meeting S2#113, Saint Kitts, KN, Jan. 25-29, 2016, S2-160345, pp. 1-3.

Huawei et al., "Discussion on RRC Connection Suspension and Resumption", 3GPP TSG-RAN WG2 NB-IOT ad-hoc Meeting, Budapest, Hungary, Jan. 19-21, 2016, R2-160431, pp. 1-5.

* cited by examiner

METHOD AND APPARATUS FOR CONNECTION PROCESSING BETWEEN A TERMINAL AND BASE STATION

TECHNICAL FIELD

The present invention is related to the field of Communications, and specifically to a method and apparatus for connection processing between a terminal and base station.

BACKGROUND TECHNIQUES

Machine to Machine (M2M) Communication is currently an important area for research in fifth generation mobile communication technologies (5G), and is an important field for application for the future of wireless communications. Within the scope of M2M research are NarrowBand-Internet of Things (NB-IoT) subtopics aimed toward terminal features such as low cost, low power consumption, low mobility, and low throughput; that is, to provide within the 200 khz frequency range a low-throughput wireless communication service for NB-IoT low-cost terminals.

In order to reduce signaling overhead and NB-IoT terminal power consumption, the existing research has led to two modes of small data transmission:

1. The control plane optimization mode (CP mode); Data Radio Bearers (DRB) will not be established between the terminal and network, neither will the Access Stratum (AS) security context be established. Data is packaged into Non-Access Stratum Protocol Data Units (NAS PDU) and attached to the control plane signal for transmission; this mode yields relatively obvious conservation of signaling, but the length of data packets transmitted at one time is limited. Relatively larger data packets must be separated into multiple smaller packets for transmission. When coverage is relatively poor, it is easy to lose packets, which makes it difficult for the receiving party to receive a complete data packet.

2. The user plane optimization mode (UP mode): the terminal and the network establish a complete connection, using DRB to transmit data; after data transmission is complete, the bearer information context, the AS security context, etc., is saved in the terminal and network-side through the suspend-activate procedure. When data is transmitted once more, both parties resume the previously stored context through restoring the procedure, and continue to use DRB bearers to transmit data. This mode does not differ greatly from the existing process, and does not limit the length of data packets in any obvious way, but its ability to conserve signaling has limitations.

The existing research has also introduced a process of capacity negotiation between the terminal and network. When the terminal initially attaches, the Attach Request carries an optional Preferred Network Behavior Indication message, indicating the terminal's supportable Network Behavior: 1, whether the control plane optimization mode is supported; 2, whether the user plane optimization mode is supported; 3, recommendation for using the control plane optimization mode or the user plane optimization mode; 4, whether the S1-u data transmission function is supported; 5, whether to require that the short message not be implemented with the attachment.

The MME network element of the network-side will include the Supported Network Behavior in the Attach Accept message to indicate the Network Behavior it is able to accept.

After the terminal and network-side negotiate to adopt the UP mode, when the terminal has uplink data requiring transmission, the air interface and network-side bearer resumption process must be triggered. When the network-side has downlink data requiring transmission, it will first page the terminal and then trigger the terminal to initiate the air interface and network-side bearer resumption process.

In the process of researching the standard RRC connection resumption process of existing technologies, the following approaches have been discussed with regard to the air interface resumption process: 1. defining a new RRC connection resumption request/resumption response message; 2. continuing to use the existing RRC connection establishment process, and adding new instructions; 3. continuing to use the existing RRC connection reestablishment process, and adding new instructions.

Beyond this, some researchers suggest that if the terminal has data it wants to transmit, it is also possible to package the data as NAS PDU or DRB multiplexing, etc., that is carried in some uplink air interface message of the resumption process; for example, carrying it in the air interface resumption request, the air interface connection establishment request, or the air interface connection establishment completion message.

Through the course of our research, we have found that within the foregoing approaches exist the following problems:

1. Presently, after suspension and before resumption, the terminal exists in an Idle state. After resumption the terminal exists in a Connected state, the same state as the terminal before and after the RRC connection establishment process, but the resumption process can be a failure for any number of reasons, such as rejection caused by congestion, wireless link failure caused by anomalies, etc; most of the failures that terminals initiating RRC connection establishment processes can encounter are similar. In addition, the expected processing mode after resumption failure, such as notifying the higher-layer to implement anomaly processing, or waiting a period of time before re-triggering access, etc., are similar to the processing modes used by the terminal after failure to initiate the RRC connection establishment process: if a new RRC connection resumption request message and its corresponding procedure were to be introduced, a large number of processing repetitions would occur.

2. In the resumption process it is possible to transmit NAS PDU of packaged user data; currently, in NAS (non-access stratum) and AS (access stratum) interaction, NAS signaling is only able to trigger the RRC establishment process; if a new resumption request message and its corresponding procedure were to be introduced, the NAS protocol could be more greatly affected. Requiring consideration is how NAS signaling could trigger a new RRC connection resumption request message and its corresponding procedure.

3. Before the terminal triggers the resumption process, various contextual information required by the user plane optimization mode has already been stored on preset terminals, base stations, and related core-network network elements. When a terminal appears because of some anomalous factor, the context information stored in any node on the core-network network element and base station is deficient; this is a new anomaly requiring a fast-paced processing mechanism.

4. Before the terminal triggers the resumption process, various context information required by the user plane optimization mode has already been stored on preset terminals, base stations, and related core-network network elements. How to identify this context information so that the terminal and the base station are able to adopt consistent identity searches and resume the correct context information is as of yet inconclusive. Presently, some terminal identities defined in the standard are primarily allocated in the terminal connection establishment process or used after terminal connection establishment completion, and are not necessarily suitable for identifying the context belonging to the terminal after the connection release. It is thus that an optimized resumption identity definition must be considered.

As for the complicated nature of the connection processing between the terminal and network in the related technology, there has presently yet to emerge an effective resolution.

CONTENTS OF THE PRESENT EMBODIMENTS

The embodiments of the present invention provide a method and apparatus for connection processing between a terminal and base station, which, at the very least, solves the problem in the related technology of the complicated nature of the connection processing between the terminal and network.

An embodiment of the present invention provides a method for connection processing between the terminal and network, comprising: the base station receiving the first request message carrying the terminal identity information that is transmitted by the terminal, wherein, the terminal identity information is used to indicate the terminal's identity, and the first request message is used to request the base station to resume the connection between the terminal and network; the base station searching for context information that matches the terminal identity information; when the base station finds the context information, it uses the context information to resume the connection with the terminal.

Alternatively, the terminal identity information comprises at least one of the following: initial terminal identity information, resumption identity information; wherein, the initial terminal identity information comprises: an initial terminal identity or information used to generate an initial terminal identity, the resumption identity information comprises: a resumption identity or information used to generate a resumption identity.

Alternatively, after the base station searches for context information matching the terminal identity information, the method further comprises: when the base station does not find the context information, the context information is acquired from the neighboring base station; the base station uses the context information obtained from the neighboring base station to resume the connection with the terminal.

Alternatively, after the base station searches for context information matching the terminal identity information, the method further comprises: when the base station does not find the context information, it uses the terminal identity information to establish a connection with the terminal.

Alternatively, the first request message comprises one of the following: the resumption request message, a message carrying the connection resumption indication.

Alternatively, the message carrying the connection resumption indication comprises at least one of the following: the Radio Resource Control (RRC) connection request message, and the RRC connection reestablishment request message.

Alternatively, searching for the first context information matching the terminal identity information comprises: when the base station is triggered by the first request message, the base station preferentially searches for the context information that matches the resumption identity information.

Alternatively, when the base station is triggered by the first request message, after the base station preferentially searches for the context information that matches the resumption identity information, the method further comprises: when the base station does not find the context information, it establishes an RRC connection with the terminal based on the initial terminal identity information.

Alternatively, after the base station searches for the context information, the method further comprises: when the base station does not find the context information, it transmits a reject message to the terminal, wherein, the reject message carries a reject cause value or indication information, wherein, the indication information is used for the terminal to determine whether to reestablish a connection with the network.

Alternatively, the reject message comprises at least one of the following: the RRC connection reject message, the RRC reestablishment reject message, the RRC connection resumption reject message.

Alternatively, the initial terminal identity comprises: identity information with length not exceeding 41 bits; the information used to generate the initial terminal identity comprises at least one of the following: SAE-Temporary Mobile Subscriber Identity (S-TMSI), Mobile Management Entity (MME) identity MMEC, MME user unique identity code m-TMSI, cell identity, unique terminal identity number C-RNTI, ShortMac-I information, a random number with length not exceeding 32 bits; the resumption identity comprises: identity information with length not exceeding 41 bits; the information used for the resumption identity comprises at least one of the following: SAE-Temporary Mobile Subscriber Identity (S-TMSI), Mobile Management Entity (MME) identity MMEC, MME user unique identity code m-TMSI, cell identity, unique terminal identity number C-RNTI, ShortMac-I information, a random number with length not exceeding 32 bits.

Another embodiment of the present invention further provides a method for connection processing between the terminal and network, comprising: the terminal transmitting the first request message carrying the terminal identity information to the base station, wherein, the terminal identity information is used to indicate the terminal's identity, and the first request message is used to request the base station to resume the connection between the terminal and network.

Another embodiment of the present invention further provides a method for connection processing between the terminal and network, comprising: the base station receiving the second request message carrying data transmission mode information transmitted by the terminal, wherein, the data transmission mode information is used to indicate the terminal's data transmission mode; the base station configures resources for the connection between the terminal and network based on the data transmission mode information.

Alternatively, the data transmission mode information comprises at least one of the following: the user plane optimization mode information, the control plane optimization mode information.

Alternatively, the base station configuring resources for the connection between the terminal and network based on the data transmission mode information comprises: the base station configuring radio resources based on the data transmission mode information; and/or the base station configuring network elements based on the data transmission mode information; and/or the base station configuring network access elements based on the data transmission mode information.

Alternatively, the base station configuring radio resources based on the data transmission mode information comprises: the base station configuring a feature of the Signaling Radio Bearers for the radio resources of the connection between the terminal and network; and/or the base station configuring a feature of data radio bearers for radio resources of the connection between the terminal and network.

Alternatively, the feature of signaling radio bearers comprises at least one of the following: whether to include the Packet Data Convergence Protocol (PDCP) protocol layer, whether to use the transparent-mode PDCP protocol layer, whether to include the PDCP protocol header, whether to include the PDCP sequence number, whether to include safety information.

The feature of data radio bearers comprises at least one of the following: whether to include the PDCP protocol layer, whether to use the transparent-mode PDCP protocol layer, whether to include the PDCP protocol header, whether to include the PDCP sequence number, whether to include safety information.

Alternatively, the user plane optimization mode information establishes a cause indication through at least one of the following connections: user plane optimization mode initiate-call data, user plane optimization mode initiate-call signaling, user plane optimization mode initiate-call anomaly reporting, user plane optimization receive-call data, user plane optimization mode receive-call signaling, user plane optimization mode receive-call anomaly reporting; the data transmission mode information of the control plane optimization mode establishes a cause indication through at least one of the following connections: control plane optimization mode initiate-call data, control plane optimization mode initiate-call signaling, control plane optimization mode initiate-call anomaly reporting, control plane optimization mode receive-call data, control plane optimization mode receive-call signaling, control plane optimization mode receive-call anomaly reporting.

Alternatively, the base station configuring a feature of the signaling radio bearer for the radio resource of the connection between the terminal and network comprises: when the data transmission mode information is control plane optimization mode initiate-call data or control plane optimization mode receive-call data, the signal radio bearer configured by the base station for the radio resources of the connection between the terminal and network does not comprise the PDCP protocol header; the base station configuring a feature of the signaling radio bearer for the radio resources of the connection between the terminal and network comprises: when the data transmission mode information is information other than the control optimization mode initiate-call data and the control optimization mode receive-call data, the signaling radio bearer configured by the base station for the radio resources of the connection between the terminal and network comprises the PDCP protocol header.

Alternatively, after the base station configures resources for the connection between the terminal and network based on the data transmission mode information, the method further comprises: the base station notifying the terminal of the configured resources of the connection between the terminal and network through a notification message.

Another embodiment of the present invention further provides a method for connection processing between the terminal and network, comprising: the terminal transmitting the second request message, carrying the data transmission mode information, to the base station, wherein, the data transmission mode information is used to indicate the terminal's data transmission mode.

Another embodiment of the present invention further provides a method for connection processing between the terminal and network, comprising: the terminal receiving the first response message, used to indicate the base station establishing or resuming connection with the terminal, transmitted by the base station; based on the radio resource configuration indication carried in the first response message, the terminal determines the mode with which to execute wireless resource configuration.

Alternatively, the terminal determining the mode with which to execute wireless resource configuration based on the radio resource configuration indication carried in the first response message comprises: when the first response message does not comprise the radio resource configuration indication and comprises an empty radio resource configuration, the terminal uses a locally stored radio resource configuration; when the first response message does not comprise the radio resource configuration indication and does not comprise an empty radio resource configuration, the terminal uses the radio resource configuration generated based on the locally stored radio resource configuration and/or the radio resource configuration contained in the first response message.

Another embodiment of the present invention further provides a method for connection processing between the terminal and network, comprising: the terminal transmitting a message carrying the terminal identity information and used to indicate RRC connection process completion to the base station, wherein, the terminal identity information is used to indicate the terminal's identity.

Alternatively, the terminal identity information comprises: the terminal identity or information used to generate the terminal identity.

Alternatively, the terminal identity comprises: identity information with length not exceeding 41 bits; the information used to generate terminal identity comprises at least one of the following: SAE-Temporary Mobile Subscriber Identity, Mobile Management Entity (MME) code MMEC, MME user unique identity number m-TMSI, cell identity, physical cell identity, unique terminal identity number C-RNTI, ShortMAC-I information, a random number with length not exceeding 32 bits.

Alternatively, before the terminal transmits the message carrying the terminal identity information that is used to indicate RRC connection process completion, the method further comprises: the terminal receiving the second response message, used to indicate the base station establishing or resuming a connection with the terminal, transmitted by the base station; according to the indication of the second response message, the terminal determines whether to transmit the message used to indicate RRC connection process completion to the base station.

Alternatively, according to the indication of the second response message, the terminal determining whether to transmit the message used to indicate RRC connection process completion to the base station comprises: when the second response message explicitly comprises instructions used to indicate whether to transmit a message used to indicate RRC connection process completion, the terminal determines whether to transmit the message used to indicate RRC connection process completion to the base station based on the instructions.

Alternatively, the terminal determining whether to transmit the message used to indicate RRC connection process completion to the base station based on the instructions of the response message comprises: when the second response message does not explicitly comprise instructions used to indicate whether to transmit a message used to indicate RRC connection process completion and comprises an empty radio resource configuration, the terminal does not transmit the message used to indicate RRC connection process completion to the base station; or, when the second response message does not explicitly comprise instructions used to indicate whether to transmit a message used to indicate RRC connection process completion and comprises a non-empty radio resource configuration, the terminal transmits the message used to indicate RRC connection process completion to the base station.

Alternatively, when the second response message does not explicitly comprise instructions used to indicate whether to transmit a message used to indicate RRC connection process completion and comprises a non-empty radio resource configuration, the message used to indicate RRC connection process completion carries the processing result of the terminal toward the radio resource configuration comprising the response message.

Another embodiment of the present invention further provides A method for connection processing between the terminal and network, comprising: the base station receiving the third request message, carrying the terminal identity information, transmitted by the terminal, wherein, the terminal identity information is used to indicate the terminal's identity, and the third request message is used to request the base station to establish or resume the connection between the terminal and network; based on the third request message instructions, the base station notifies the network-side to establish or resume connection with the terminal.

Alternatively, the terminal identity information comprises at least one of the following: initial terminal identity information, resumption identity information, wherein, the initial establishment identity information comprises: an initial terminal identity or information used to generate an initial terminal identity, the resumption identity information comprises: a resumption identity or information used to generate a resumption identity.

Alternatively, the initial terminal identity comprises: identity information with length not exceeding 41 bits; the information used to generate the initial terminal identity comprises at least one of the following: SAE-Temporary Mobile Subscriber Identity (S-TMSI), Mobile Management Entity (MME) identity MMEC, MME user unique identity code m-TMSI, cell identity, unique terminal identity number C-RNTI, ShortMac-I information, a random number with length not exceeding 32 bits; the resumption identity comprises: identity information with length not exceeding 41 bits; the information used for the resumption identity comprises at least one of the following: SAE-Temporary Mobile Subscriber Identity (S-TMSI), Mobile Management Entity (MME) identity MMEC, MME user unique identity code m-TMSI, cell identity, unique terminal identity number C-RNTI, ShortMac-I information, a random number with length not exceeding 32 bits.

Alternatively, the base station notifying the network-side to establish or resume connection with the terminal based on the third request message instructions comprises: the base station notifying the network-side to establish or resume connection with the terminal based on the third request message, and obtaining the context information matching the resumption identity information.

Alternatively, the base station obtaining the context information matching the resumption identity information based on the third request message comprises: the base station searching for the context information matching the resumption identity information; or, the base station searching for the context information matching the resumption identity information in the neighboring base station.

Alternatively, the third request message further comprises: resumption instructions, wherein, the resumption instructions instruct to resume the connection with the base station.

Alternatively, the base station obtaining the context information matching the resumption identity information based on the third request message comprises: when triggered by the resumption request message or the resumption instructions, the base station searches for the context information matching the resumption identity information; or, when triggered by the resumption request message or the resumption instructions, the base station searches for the context information matching the resumption identity information in the neighboring base station.

Alternatively, after the base station notifies the network-side to establish or resume the connection with the terminal based on the third request message, the method further comprises: the base station receiving the third response message that indicates the network-side establishing or resuming a connection result with the terminal; when the base station receives the third response message that indicates the network-side establishing or resuming a connection with the terminal successfully, the base station establishes or resumes connection between the base station and the terminal.

Alternatively, after the base station receives the third response message that indicates the network-side establishing or resuming a connection result with the terminal, the method further comprises: when the base station receives the third response message that indicates the network-side establishing or resuming connection with the terminal unsuccessfully, but the base station obtains the context information that matches the resumption identity information successfully, the base station reestablishes the connection between the terminal and network.

Alternatively, after the base station notifies the network-side to establish or resume connection with the terminal, the method further comprises: when the base station receives the third response message that indicates the network-side establishing or resuming connection with the terminal unsuccessfully, and the base station obtaining the context information matching the resumption identity information is also unsuccessful, the base station transmits a reject message to the terminal, wherein, the reject message is used to reject the operations requested by the request message; the reject message carries the reject cause value.

Alternatively, after the base station transmits the reject message to the terminal, the method further comprises: the terminal disregarding the transmission process of the random access preamble, and once more transmitting the request message carrying the terminal identity information to the base station.

Another embodiment of the present invention further provides a method for connection processing between the terminal and network, comprising: the terminal transmitting the third request message, carrying the terminal identity information, to the base station, wherein, the terminal identity information is used to indicate the terminal's identity, and the third request message is used to request the base station to establish or resume the connection between the terminal and network.

Alternatively, after the terminal transmits the third request message carrying the terminal identity information to the base station, the method further comprises: the terminal extending the timer's timing value; or, the terminal extending the timer's timing value based on the base station indication; wherein, the timing value is the time that the terminal waits for the base station to transmit the response message.

Another embodiment of the present invention further provides a method for connection processing between the terminal and network, comprising: radio bearers using simplified PDCP functions prior to the establishment of AS layer security.

Alternatively, Radio Bearers comprise one of the following: Signaling Radio Bearers (SRB), Data Radio Bearers (DRB).

Alternatively, Radio Bearers using simplified PDCP functions comprises at least one of the following: Radio Bearers using the transparent-mode PDCP protocol layer, Radio Bearers not containing the PDCP protocol header, Radio Bearers not containing the PDCP sequence number.

Alternatively, the method further comprises: before the AS layer security is established, the terminal can use Radio Bearers of simplified PDCP functions; or, Before the AS layer security is established, the base station can use Radio Bearers of simplified PDCP functions.

Alternatively, determining the Signaling Radio Bearers to use simplified PDCP functions through at least one of the following comprises: the predefined mode, the preconfigured mode, the terminal and base station negotiation mode, the mode whereby the base station transmits the following messages to the terminal: system messages, dedicated notification messages.

Alternatively, the system messages or dedicated notification messages carry instructions that instruct the Radio Bearers to use simplified PDCP functions.

Another embodiment of the present invention further provides a terminal and network connection processing apparatus, applicable to the base station, comprising: the first receiver module, configured to receive the first request message carrying terminal identity information transmitted by the terminal, wherein, the terminal identity information is used to indicate the terminal's identity, and the first request message is used to request the base station to resume the connection between the terminal and network; the search module, configured to search for the context information matching the terminal identity information; the first resumption module, configured to use the context information to resume the connection with the terminal when the context information is found.

Another embodiment of the present invention further provides a terminal and network connection processing apparatus, applicable to the terminal, comprising: the first transmission module, configured to transmit the first request message carrying the terminal identity information to the base station, wherein, the terminal identity information is used to indicate the terminal's identity, and the request message is used to request the base station to resume the connection between the terminal and network.

Another embodiment of the present invention further provides a terminal and network connection processing apparatus, applicable to the base station, comprising: the second receiver module, configured to receive the second request message carrying the data transmission mode information transmitted by the terminal, wherein, the data transmission mode information is used to indicate the terminal's data transmission mode; the configuration module, set up to configure the resources of the connection between the terminal and network based on the data transmission mode information.

Another embodiment of the present invention further provides a terminal and network connection processing apparatus, applicable to the terminal, comprising: the second transmission module, configured to transmit the second request message carrying the data transmission mode information to the base station, wherein, the data transmission mode information is used to indicate the terminal's data transmission mode.

Another embodiment of the present invention further provides a terminal and network connection processing apparatus, applicable to the terminal, comprising: the third receiver module, configured to receive the first response message transmitted by the base station and used to indicate the base station establishing or resuming connection with the terminal; the first determination module, configured to determine the mode with which to execute radio resource configuration based on the radio resource configuration indication carried in the first response message.

Another embodiment of the present invention further provides a terminal and network connection processing apparatus, applicable to the base station, comprising: the fourth receiver module, configured to receive the message carrying the terminal identity information and used to indicate the RRC connection process completion transmitted by the terminal, wherein, the terminal identity information is used to indicate the terminal's identity, the first the processing module, configured to process the connection with the terminal based on the message used to indicate RRC connection process completion.

Another embodiment of the present invention further provides a terminal and network connection processing apparatus, applicable to the terminal, comprising: the third transmission module, configured to transmit the message carrying terminal identity information and used to indicate RRC connection process completion to the base station, wherein, the terminal identity information is used to indicate the terminal's identity.

Another embodiment of the present invention further provides a terminal and network connection processing apparatus, applicable to the base station, comprising: the fourth receiver module, configured to receive the third request message, carrying the terminal identity information, transmitted by the terminal, wherein, the terminal identity information is used to indicate the terminal's identity, and the third request message is used to request the base station to establish or resume the connection between the terminal and network; the processing module, configured to notify the network-side to establish or resume connection with the terminal based on the third request message indication.

Another embodiment of the present invention further provides a terminal and network connection processing apparatus, applicable to the terminal, comprising: the fourth transmission module, configured to transmit the third request message carrying the terminal identity information to the base station, wherein, the terminal identity information is used to indicate the terminal's identity, and the third request message is used to request the base station to establish or resume the connection between the terminal and network.

Another embodiment of the present invention further provides a method for connection processing between the terminal and network, comprising: the base station receiving the fourth request message, carrying the resumption identity information, transmitted by the terminal, the fourth request message is used to request the base station to resume the connection between the terminal and network; the base station resumes the connection with the terminal based on the resumption identity information.

Alternatively, before the base station receives the fourth request message carrying the resumption identity information transmitted by the terminal, the method further comprises: the base station allocating all of, or a portion of, the resumption identity information to the terminal.

Alternatively, the base station allocating all of, or a portion of, the resumption identity information to the terminal comprises: the base station transmitting all of, or a portion of, the resumption identity information to the terminal when the context information is suspended.

Alternatively, the base station allocating all of, or a portion of, the resumption identity information to the terminal comprises: the base station transmitting all of, or a portion of, the resumption identity information to the terminal when the context information is suspended through the connection-suspension message; and/or the base station transmitting all of, or a portion of, the resumption identity information to the terminal when the context information is suspended through the connection-release message.

Alternatively, before the base station receives the fourth request message carrying the resumption identity information transmitted by the terminal, the method further comprises: the base station allocating, to the terminal, the resources required for the transmission of the fourth request message.

Alternatively, the base station allocating, to the terminal, the resources required for the transmission of the fourth request message comprises at least one of the following: the base station indicating the resources in the random access response message transmitted to the terminal; the base station indicating the resources in a channel format message or a Media Access Control package carrying a random access response message transmitted to the terminal.

Alternatively, the fourth request message comprises one of the following: a resumption request message, or a message carrying the resumption identity information.

Alternatively, the message carrying the resumption identity information comprises at least one of the following: the Radio Resource Control (RRC) connection request message, and the RRC connection reestablishment request message.

Alternatively, the resumption identity information comprises at least one of the following: the terminal context identity, the global cell identity, the physical cell identity, the base station identity, and the preset bit length value.

Alternatively, the terminal context identity is a 16-bit value.

Alternatively, the global cell identity comprises at least one of the following: the global cell identity of the cell when the context information is suspended, the global cell identity of a cell storing the terminal context information.

Alternatively, the physical cell identity comprises at least one of the following: the physical cell identity of the cell when the context information is suspended, the physical cell identity of a cell storing the terminal context information.

Alternatively, the base station identity comprises at least one of the following: the base station identity of the base station when the context information is suspended, the base station identity of a base station storing the terminal context information.

Alternatively, the preset bit length value comprises at least one of the following: a set bit length value; a length value between 16 bits and 44 bits.

Another embodiment of the present invention further provides A method for connection processing between the terminal and network, comprising: the terminal transmitting the fourth request message carrying the resumption identity information to the base station, wherein, the fourth request message is used to request the base station to resume the connection between the terminal and network, the resumption identity information is used to resume the connection between the terminal and network.

Alternatively, before the terminal transmits the fourth request message carrying the resumption identity information to the base station, the method further comprises: the terminal obtaining all of, or a portion of, the information used for generating the resumption identity information through reading a system message of the cell; or, the terminal constructing all of, or a portion of, the resumption identity information; or, the terminal receiving all of, or a portion of, the resumption identity information allocated by the base station.

Alternatively, the terminal obtaining all of, or a portion of, the information used for generating the resumption identity information through reading a system message of the cell comprises: the terminal obtaining the global cell identity through reading a system message of the cell; and/or the terminal obtaining the physical cell identity through reading a system message of the cell; and/or the terminal obtaining the base station identity through reading a system message of the cell.

Alternatively, the terminal receiving all of; or a portion of, the resumption identity information allocated by the base station comprises: the terminal receives all of, or a portion of, the resumption identity information allocated by the base station when the context information is suspended.

Alternatively, the terminal receiving all of, or a portion of, the resumption identity information allocated by the base station when the context information is suspended comprises: the terminal receiving all of, or a portion of, the resumption identity information allocated by the base station through the connection-suspension message when the context information is suspended; and/or the terminal receiving all of, or a portion of, the resumption identity information allocated by the base station through the connection-release message when the context information is suspended.

Alternatively, before the terminal transmits the fourth request message carrying the resumption identity information to the base station, the method further comprises: the terminal receiving the resources required for the transmission of the fourth request message allocated by the base station.

Alternatively, the terminal receiving the resources required for the transmission of the fourth request message allocated by the base station comprises: the terminal receiving the resources indicated by the base station in the random access message; and/or the terminal receiving the resources indicated by the base station in the channel format message or the Media Access Control (MAC) package carrying the random access response message.

Alternatively, after the terminal receives the resources required for the transmission of the fourth request message allocated by the base station, the method further comprises: the terminal constructing the resumption identity information based on the resources.

Alternatively, the terminal constructing the resumption identity information based on the resources comprises: the terminal constructing different resumption identity information based on differing sizes of resources.

Alternatively, the terminal constructing resumption identity information based on resources comprises: the terminal using the terminal context identity and preset information to construct the resumption identity information; wherein, preset information comprises one of the following: all of, or a portion of, the global cell identity; all of, or a portion of, the physical cell identity; all of, or a portion of, the base station identity.

Alternatively, the fourth request message comprises one of the following: a resumption request message, or a message carrying the resumption identity information.

Alternatively, the message carrying the resumption identity information comprises at least one of the following: the Radio Resource Control (RRC) connection request message, and the RRC connection reestablishment request message.

Alternatively, the resumption identity information comprises at least one of the following: the terminal context identity, the global cell identity, the physical cell identity, the base station identity, and the preset bit length value.

Alternatively, the terminal context identity is a 16-bit value.

Alternatively, the global cell identity comprises at least one of the following: the global cell identity of the cell when the context information is suspended, the global cell identity of a cell storing the terminal context information.

Alternatively, the physical cell identity comprises at least one of the following: the physical cell identity of the cell when the context information is suspended, the physical cell identity of a cell storing the terminal context information.

Alternatively, the base station identity comprises at least one of the following: the base station identity of the base station when the context information is suspended, the base station identity of a base station storing the terminal context information.

Alternatively, the preset bit length value comprises at least one of the following: a set bit length value; a length value between 16 bits and 44 bits.

Another embodiment of the present invention further provides a terminal and network connection processing apparatus, applicable to the base station, comprising: the seventh receiver module, configured to receive the fourth request message carrying the resumption identity information transmitted by the terminal; the fourth request message is used to request the base station to resume the connection between the terminal and network; the third resumption module, configured to resume the connection with the terminal based on the resumption identity information.

Another embodiment of the present invention further provides a terminal and network connection processing apparatus, applicable to the terminal, comprising: the seventh transmission module, configured to transmit the fourth request message carrying the resumption identity information to the base station, wherein, the fourth request message is used to request the base station to resume the connection between the terminal and network, and the resumption identity information is used to resume the connection between the terminal and network.

The embodiments of the present invention further provide a computer storage medium, which can store executable instructions that are used to achieve the connection processing methods between the network and terminal that are outlined above.

The implementation of the embodiments of the present invention—wherein the base station receives the first request message carrying the terminal's identity information that is transmitted by the terminal, the terminal identity information is used to indicate the identity of the terminal, the first request message is used to request the base station to resume the connection between the terminal and network, the base station searches for context information matching the terminal identity information, and the base station, when it finds the context information, uses the context information to resume the connection with the terminal, since the terminal requesting connection resumption could have already established a connection with the base station before, and the base station may have retained the terminal's context information, the request message received by the base station carries a connection request message, which can instruct the base station to preferentially resume the connection with the terminal; the base station searches for whether the context information matching the indicated terminal identity information is present based on the terminal identity information carried in the request message; if the context information is found, the base station directly resumes connection with the terminal based on context information-solves the problem of complex connection processing between the terminal and base station in the related art, and achieves high-speed connection resumption between the terminal and network. Beyond this, the base station makes use of the original context information, thereby avoiding the repeat execution of a connection establishment procedure and improving the efficiency of connection processing between the terminal and network.

BRIEF DESCRIPTION OF THE DRAWINGS

The accompanying drawings described herein are included to provide a better understanding of the present invention, and constitute one part of this application. The schematic embodiments and their explanations are used to explain the present invention, and do not serve to limit its claims. The drawings:

DETAILED DESCRIPTION

The present invention will hereinafter be described in detail with reference to the accompanying drawings and embodiments. It should be noted that the embodiments of the present application and the features thereof can be combined in a non-conflicting manner.

It should be noted that the terminology "first," "second," etc. in the explanations, Claims, and accompanying drawings of the present invention are used only to distinguish like objects, and need not be used to describe specific sequences or orders of operation.

Embodiment 1

Figure 1:
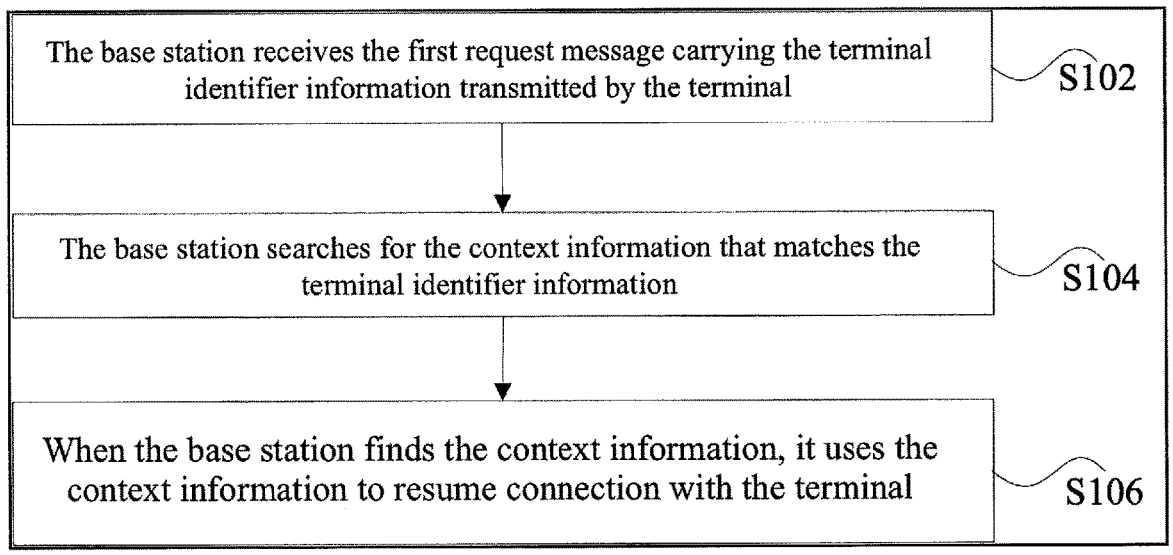
FIG. 1 is a flowchart of an optional connection processing method between the terminal and base station based on the embodiments of the present invention.

The present embodiment provides a method for connection processing between the terminal and network. FIG. 1 is a flowchart of an optional connection processing method between the terminal and base station based on the embodiments of the present invention. As FIG. 1 shows, the procedure comprises the following steps:

Step S102, the base station receives the first request message carrying the terminal identity information that is transmitted by the terminal, wherein, the terminal identity information is used to indicate the identity of the terminal, and the first request message is used to request the base station to resume the connection between the terminal and network;

Step S104, the base station searches for context information matching the terminal identity information;

Step S106, when the base station finds the context information, it uses the context information to resume the connection with the terminal.

Alternatively, the above steps can be applied to resuming a wireless connection or to a user plane optimization scenario, especially to an RRC connection resumption scenario, such as: with NB-IoT technology, when the user plane optimization mode is adopted, the scenario whereby RRC connection between the base station and the terminal is resumed.

Since the terminal requesting connection resumption could have already established a connection with the base station before, and the base station may have retained the terminal's context information, the request message received by the base station carries a connection request message, which can instruct the base station to preferentially resume the connection with the terminal; the base station searches for whether the context information matching the indicated terminal identity information is present based on the terminal identity information carried in the request message; if the context information is found, the base station directly resumes connection with the terminal based on context information; the implementation of the above steps thereby solves the problem of complex connection processing between the terminal and base station in the related art, and achieves high-speed connection resumption between the terminal and network. Beyond this, the base station makes use of the original context information, thereby avoiding the repeat execution of a connection establishment flow and improving the efficiently of connection processing between the terminal and network.

Within the present embodiment, terminal identity information can, but is not limited to, comprise at least one of the following: initial terminal identity information, resumption identity information; wherein, initial terminal identity information comprises: initial terminal identity or information used to generate initial terminal identity; resumption identity information comprises: resumption identity or information used to generate resumption identity.

The following describes the terminal identity information through the use of examples.

Terminal identity information can directly carry initial establishment identity and resumption identity; it can also carry information able to generate the initial establishment identity and resumption identity based on the need to resume connection. For example, suppose the initial establishment identity is composed of the initial establishment identity value of the first bit value and a pseudo-random code of the second bit value, and the resumption identity is composed of the resumption identity value of the third bit value and a pseudo-random code of the fourth bit value; one type of terminal identity information can carry the combined initial establishment identity and the combined resumption identity; another type of terminal identity information can directly carry the initial establishment identity value of the first bit value, the pseudo-random code of the second bit value, the resumption identity value of the third bit value, and the pseudo-random code of the fourth bit value; based on the indication, the initial establishment value of the first bit value and the pseudo-random code of the second bit value constitute the initial establishment identity, or, based on the indication the indication, the resumption identity value of the third bit value and the pseudo-random code of the fourth bit value constitute the resumption identity.

Alternatively, after Step S104, when the base station has not found the context information, it can obtain the context information from the neighboring base station and resume connection with the terminal using the context information obtained in the neighboring base station. When the base station has not found the context information, the base station can further use the terminal identity information to establish a connection with the terminal.

Alternatively, the first request message can, but is not limited to, comprise one of the following: the resumption request message, a message carrying the connection resumption indication.

Alternatively, the message carrying a connection resumption indication can, but is not limited to, comprise at least one of the following: the RRC connection request message, the RRC connection reestablishment request message.

Alternatively, in Step S104, when triggered by the first request message, the base station can preferentially search for context information that matches the resumption identity information; after which, if the base station has not found the context information, it can establish an RRC connection with the terminal based on the initial terminal identity information.

Alternatively, after Step S104, when the base station has not found the context information, it can further transmit a reject message to the terminal, wherein, the reject message carries a reject cause value or indication information, wherein, the indication information is used for the terminal to determine whether to reestablish the connection with the network.

Within the present embodiment, the reject message can, but is not limited to, comprise at least one of the following: the RRC connection reject message, the RRC reestablishment reject message, the RRC connection resumption reject message.

Within the present embodiment, the initial terminal identity can, but is not limited to, comprise: identity information with length not exceeding 41 bits; information used to generate the initial terminal identity can, but is not limited to, comprise at least one of the following: SAE-Temporary Mobile Subscriber Identity (S-TMSI), Mobile Management Entity (MME) identity MMEC, MME user unique identity code m-TMSI, cell identity, unique terminal identity number C-RNTI, ShortMac-I information, a random number with length not exceeding 32 bits; resumption identity can, but is not limited to, comprise: identity information with length not exceeding 41 bits; information used for resumption identity can, but is not limited to, comprise at least one of the following: SAE-Temporary Mobile Subscriber Identity (S-TMSI), Mobile Management Entity (MME) identity MMEC, MME user unique identity code m-TMSI, cell identity, unique terminal identity number C-RNTI, ShortMac-I information, a random number with length not exceeding 32 bits.

The present embodiment further provides a method for connection processing between the terminal and network, wherein, the method comprises the following steps: the terminal transmitting the first request message carrying the terminal identity information to the base station, wherein, the terminal identity information is used to indicate the identity of the terminal, and the first request message is used to request the base station to resume the connection between the terminal and network.

Alternatively, the message of the existing RRC connection establishment flow can be used to execute the air interface resumption flow between the terminal and network.

Alternatively, the first request message can be an RRC Connection Request, which can simultaneously carry the initial establishment identity and the resumption identity acting as the terminal identity. The base station can, but is not limited to, preferentially use the resumption identity based on the resumption indication.

Alternatively, the resumption identity can be a combination of C-RNTI and Cell Identity (ID) information.

Alternatively, a new connection resumption indication can be added to the RRC Connection Request; for example, a connection resumption indication indicating the preferential use of the resumption identity information.

Figure 2:
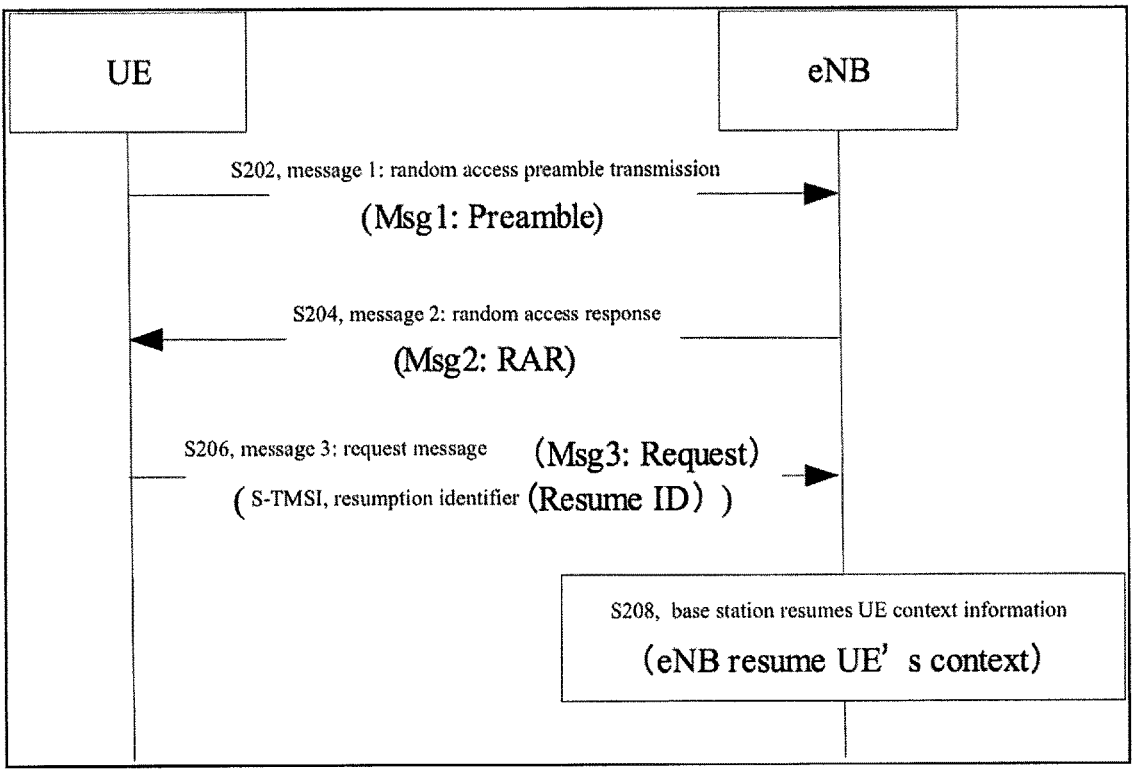
FIG. 2 is a flowchart of a method for connection processing between the terminal and network based on an alternate embodiment of the present invention.

The following describes the connection processing procedure of the present embodiment based on an optional mode of implementation. FIG. 2 is a flowchart of a method for connection processing between the terminal and network based on an alternate embodiment of the present invention. As is shown in FIG. 2, the procedure comprises the following steps:

Step S202, message 1 is the random access preamble transmission between the terminal and the base station.

Step S204, the base station transmits message 2 to the terminal: the random access response.

Step S206, the base station receives the request message transmitted by the terminal (equivalent to the first request message outlined above), wherein, the request message can carry the initial terminal identity (e.g., S-TMSI) and/or the resumption identity (Resume ID).

Step S208, the base station resumes UE context information based on the request message.

Figure 3:
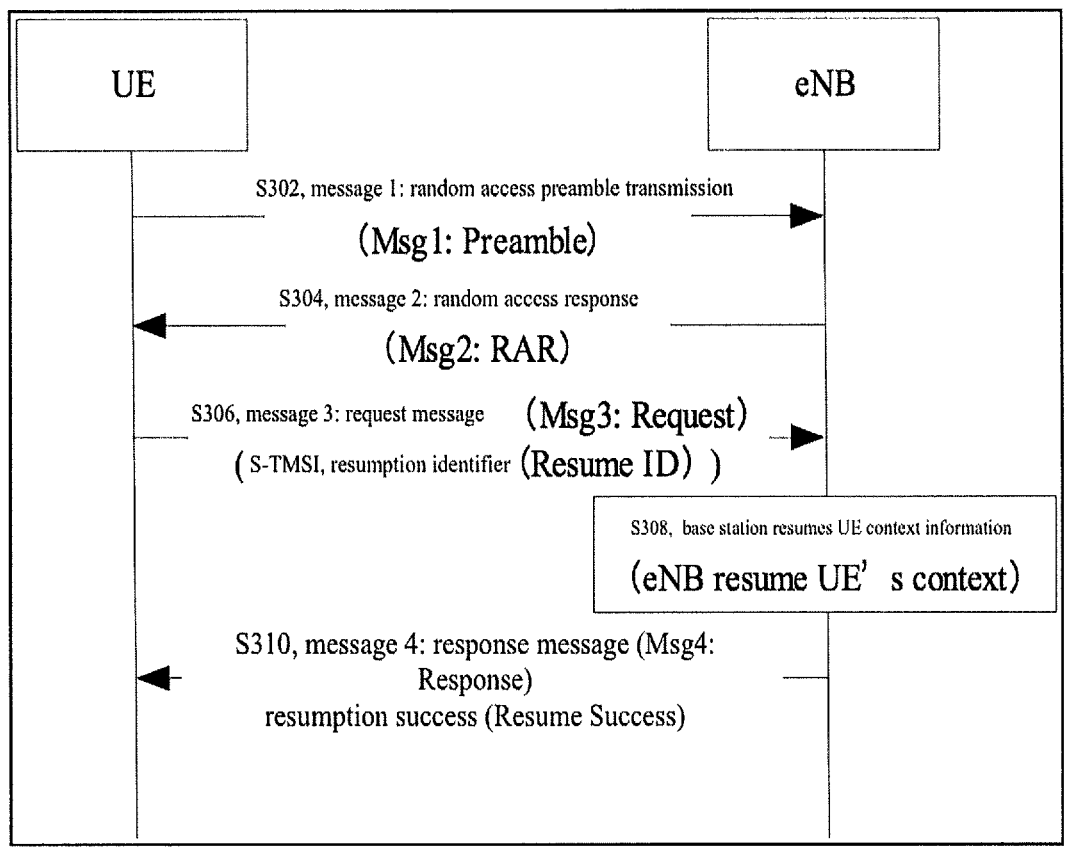
FIG. 3 is another flowchart of a method for connection processing between the terminal and network based on an alternate embodiment of the present invention.

FIG. 3 is another flowchart of a method for connection processing between the terminal and network based on an alternate embodiment of the present invention. As is shown in FIG. 3, the procedure comprises the following steps:

Step S302, message 1 is the random access preamble transmission between the terminal and the base station.

Step S304, the base station transmits message 2 to the terminal: the random access response.

Step S306, the base station receives the request message transmitted by the terminal (equivalent to the first request message outlined above), wherein, the request message can carry the initial terminal identity (e.g., S-TMSI) and/or the resumption identity (Resume ID).

Step S308, the base station resumes UE context information based on the request message.

Step S310, the base station transmits the response message used to indicate resumption success to the terminal.

Figure 4:
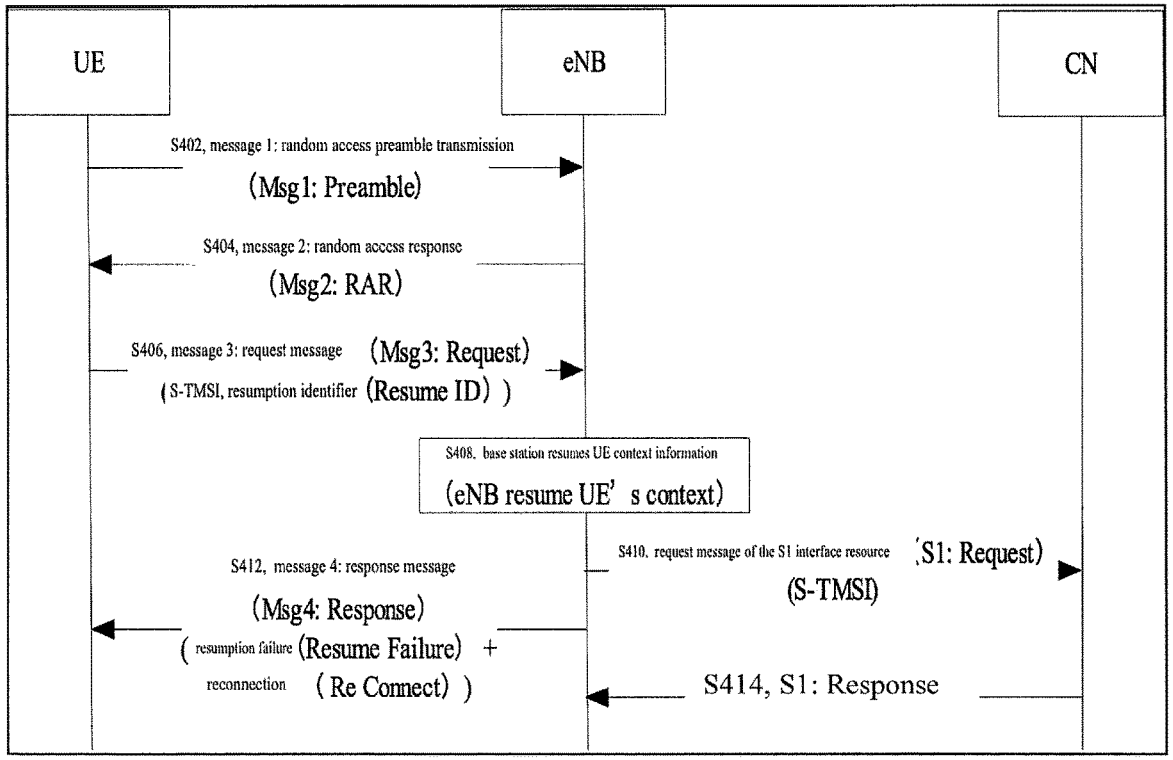
FIG. 4 is another flowchart of a method for connection processing between the terminal and network based on an alternate embodiment of the present invention.

FIG. 4 is another flowchart of a method for connection processing between the terminal and network based on an alternate embodiment of the present invention. As FIG. 4 shows, the procedure comprises the following steps:

Step S402, message 1 is the random access preamble transmission between the terminal and the base station.

Step S404, the base station transmits message 2 to the terminal: the random access response.

Step S406, the base station receives the request message transmitted by the terminal (equivalent to the first request message outlined above), wherein, the request message can carry the initial terminal identity (e.g., S-TMSI) and/or the resumption identity (Resume ID).

Step S408, the base station resumes UE context information based on the request message.

Step S410, the base station requests from the network-side a request message resuming S1 interface resources; the request message can, but is not limited to, carry the initial terminal identity (e.g., S-TMSI).

Step S412, the base station transmits the response message used to indicate resumption failure to the terminal; the response message can further carry a message instructing the terminal to reestablish connection.

Step S414, the base station receives the response message of resuming S1 interface resources of the network-side.

Through the descriptions of the above embodiment, it will be apparent to those skilled in the related art that the above methods can be implemented using software and the necessary universal hardware platform, and can also be implemented with hardware, but for many circumstances the former implementation mode is ideal. Based on this understanding, the technical solutions of the present invention themselves, or the portion of which that will contribute to the existing art, can be embodied in the form of computer software products stored on a storage medium (e.g., ROM/RAM, magnetic disks, optical disks), comprising several instructions used to make a terminal device (e.g., a phone, computer, server, or network device, etc.) execute each method of the present embodiment.

Embodiment 2

Figure 5:
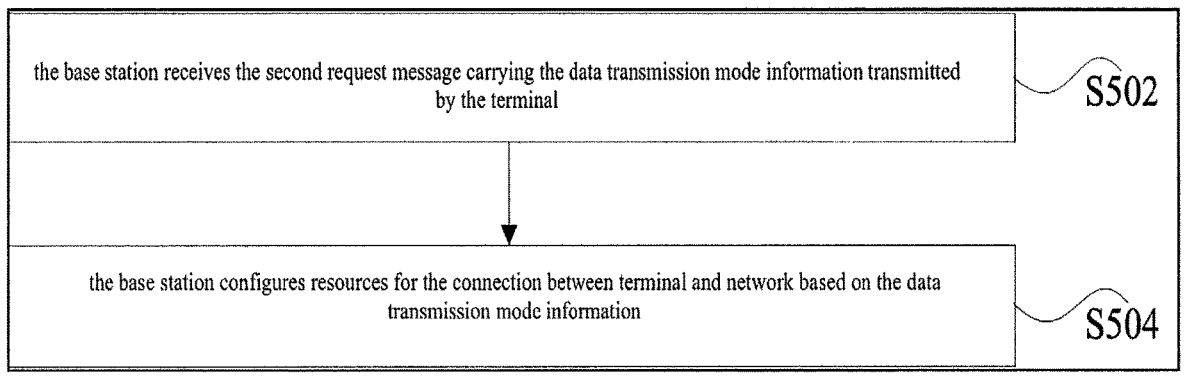
FIG. 5 is a flowchart based on another optional method of connection processing between the terminal and network of the embodiments of the present invention.

The present embodiment provides a method for connection processing between the terminal and network. FIG. 5 is a flowchart based on another optional method of connection processing between the terminal and network of the embodiments of the present invention. As is shown in FIG. 5, the procedure comprises the following steps:

Step S502, the base station receives the second request message carrying data transmission mode information transmitted by the terminal, wherein, the data transmission mode information is used to indicate the terminal's data transmission mode;

Step S504, the base station configures the resources for the connection between terminal and network based on the data transmission mode information.

Alternatively, the data transmission mode information can, but is not limited to, comprise at least one of the following: user plane optimization mode information, control plane optimization mode information.

Alternatively, the base station can configure the resources for the connection between terminal and network based on at least one of the following: the base station configures radio resources based on the data transmission mode information; the base station configures network elements based on the data transmission mode information; the base station configures network access resources based on the data transmission mode information.

Alternatively, the base station can configure radio resources based on at least one of the following modes:

the base station configures features of Signaling Radio Bearers for the radio resources of the connection between terminal and network; the base station configures features of Data Radio Bearers for the radio resources of the connection between terminal and network.

Alternatively, features of Signaling Radio Bearers can, but are not limited to, comprise at least one of the following: whether to include the Packet Data Convergence Protocol (PDCP) protocol layer, whether to use the transparent-mode PDCP protocol layer, whether to include the PDCP protocol header, whether to include the PDCP sequence number, whether to include safety information.

Features of Data Radio Bearers can, but are not limited to, comprise at least one of the following: whether to include the PDCP protocol layer, whether to use the transparent-mode PDCP protocol layer, whether to include the PDCP protocol header, whether to include the PDCP sequence number, whether to include safety information.

Alternatively, the user plane optimization mode information can, but is not limited to, an establishment cause indication through at least one of the following connections: user plane optimization mode initiate-call data, user plane optimization mode initiate-call signaling, user plane optimization mode initiate-call anomaly reporting, user plane optimization receive-call data, user plane optimization mode receive-call signaling, user plane optimization mode receive-call anomaly reporting; the data transmission mode information of the control plane optimization mode can, but is not limited to, an establishment cause indication through at least one of the following connections: control plane optimization mode initiate-call data, control plane optimization mode initiate-call signaling, control plane optimization mode initiate-call anomaly reporting, control plane optimization mode receive-call data, control plane optimization mode receive-call signaling, control plane optimization mode receive-call anomaly reporting.

Alternatively, the base station configuring features of Signaling Radio Bearers for the radio resources of the connection between terminal and network comprises: when the data transmission mode information is initiate-call data or receive-call data of the control plane optimization mode, the Signaling Radio Bearers configured by the base station for the radio resources of the connection between terminal and network might not comprise the PDCP protocol header, the base station configuring a feature of Signaling Radio Bearers for the radio resources of the connection between terminal and network comprises: when the data transmission mode information is information other than the initiate-call data and receive-call data of the control plane optimization mode, the Signaling Radio Bearers configured by the base station for the radio resources of the connection between terminal and network can comprise the PDCP protocol header.

Alternatively, after the base station configures the resources for the connection between terminal and network based on the data transmission mode information, the base station can notify the terminal of the resources configured for the connection between the terminal and base station through the notification message.

The present embodiment further provides a method for connection processing between the terminal and network, wherein, the method comprises the following steps: the terminal transmitting the second request message, carrying data transmission mode information, to the base station, wherein, the data transmission mode information is used to indicate the terminal's data transmission mode.

Figure 6:
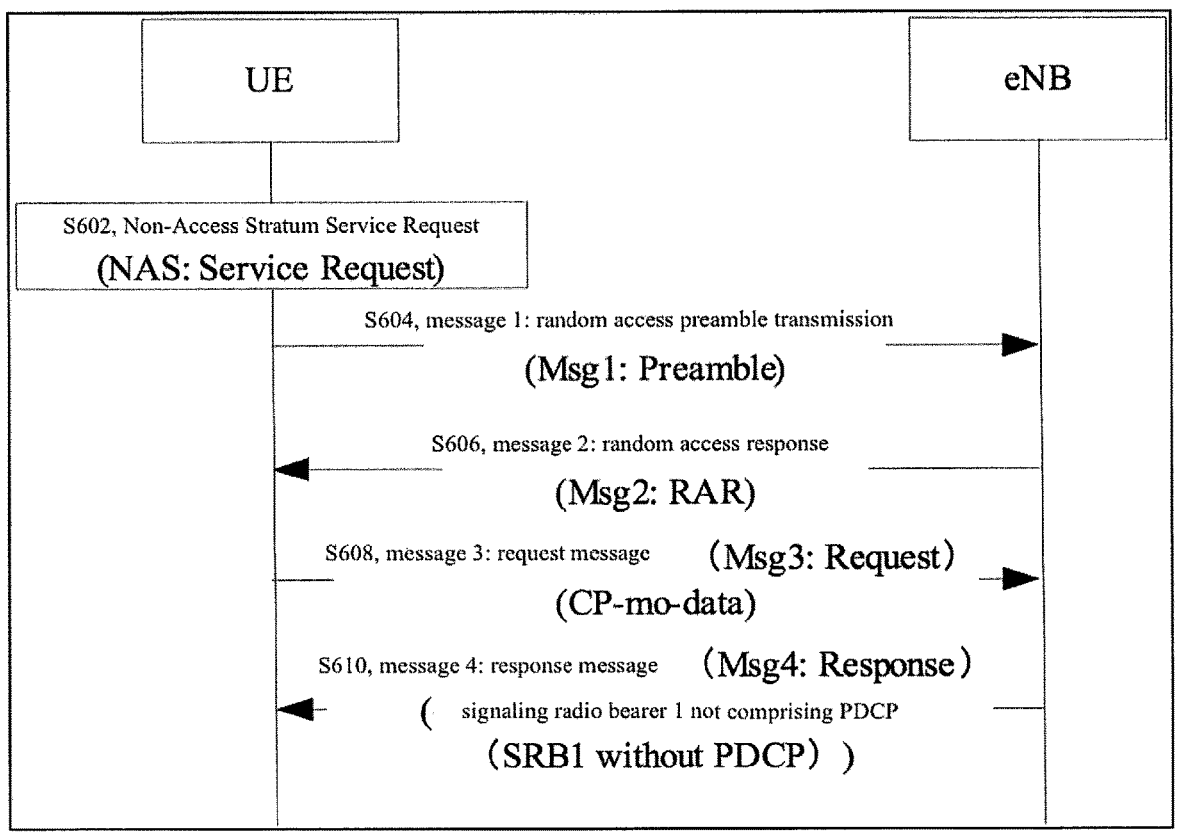
FIG. 6 is another flowchart of a method for connection processing between the terminal and network based on an alternate embodiment of the present invention.

The following describes the connection processing procedure of the present embodiment based on an optional mode of implementation. FIG. 6 is another flowchart of a method for connection processing between the terminal and network based on an alternate embodiment of the present invention. As FIG. 6 shows, the procedure comprises the following steps:

Step S602, the terminal processes the non-access stratum service requests.

Step S604, message 1 is the random access preamble transmission between the terminal and the base station.

Step S606, the base station transmits message 2 to the terminal: the random access response.

Step S608, the base station receives the request message (equivalent to the second request message outlined above) carrying the data transmission mode information (e.g., Cp-mo-data) transmitted by the terminal.

Step S610, the base station transmits a request message response message to the terminal (e.g., Signaling Radio Bearers 1 (SRB1) not carrying PDCP).

Figure 7:
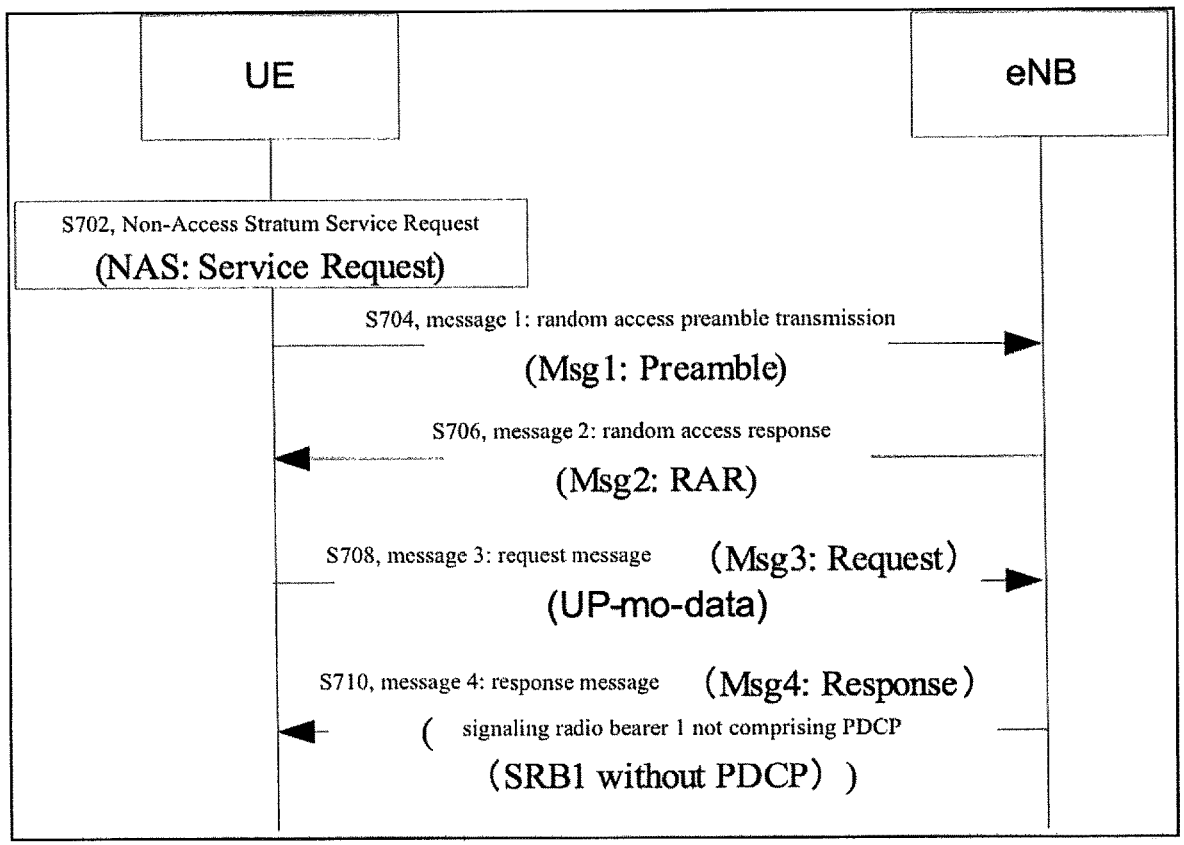
FIG. 7 is another flowchart of a method for connection processing between the terminal and network based on an alternate embodiment of the present invention.

FIG. 7 is another flowchart of a method for connection processing between the terminal and network based on an alternate embodiment of the present invention. As FIG. 7 shows, the procedure comprises the following steps:

Step S702, the terminal processes the non-access stratum service requests.

Step S704, message 1 is the random access preamble transmission between the terminal and the base station.

Step S706, the base station transmits message 2 to the terminal: the random access response.

Step S708, the base station receives the request message (equivalent to the second request message outlined above) carrying the data transmission mode information (e.g., UP-mo-data) transmitted by the terminal.

Step S710, the base station transmits a request message response message to the terminal (e.g., Signaling Radio Bearers 1 (SRB1) carrying PDCP).

Figure 8:
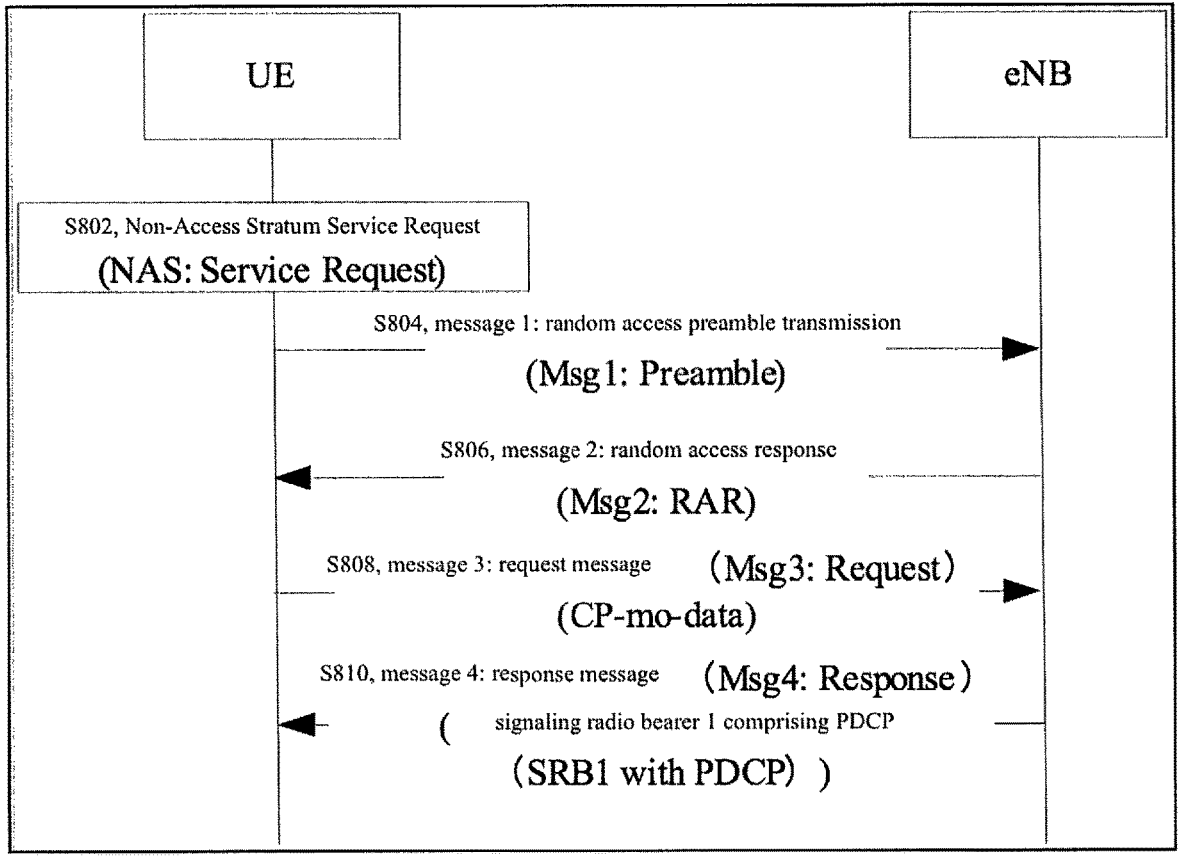
FIG. 8 is another flowchart of a method for connection processing between the terminal and network based on an alternate embodiment of the present invention.

FIG. 8 is another flowchart of a method for connection processing between the terminal and network based on an alternate embodiment of the present invention. As is shown in FIG. 8, the procedure comprises the following steps:

Step S802, the terminal processes non-access stratum service requests.

Step S804, message 1 is the random access preamble transmission between the terminal and the base station.

Step S806, the base station transmits message 2 to the terminal: the random access response.

Step S808, the base station receives the request message (equivalent to the second request message outlined above) carrying the data transmission mode information (e.g., Cp-mo-data) transmitted by the terminal.

Step S810, the base station transmits a request message response message to the terminal (e.g., Signaling Radio Bearers 1 (SRB1) carrying PDCP).

Embodiment 3

Figure 9:
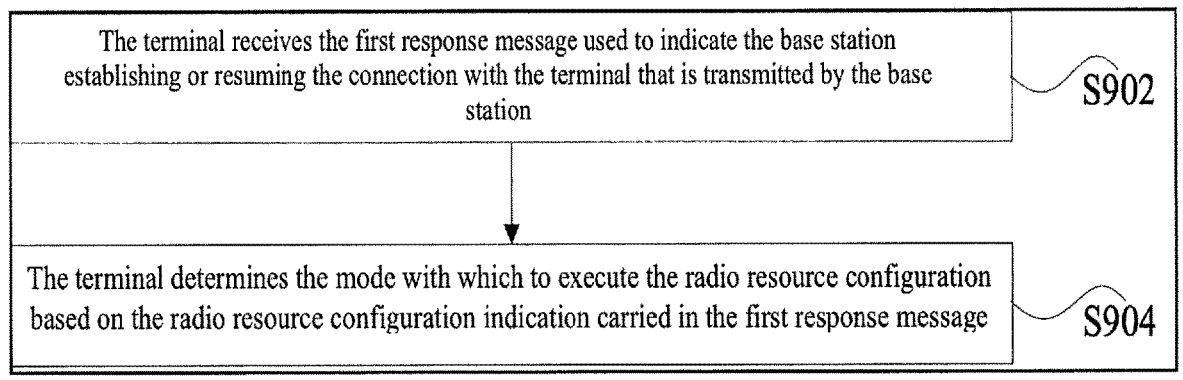
FIG. 9 is a flowchart based on another optional method of connection processing between the terminal and network of the embodiments of the present invention.

The present embodiment provides a method for connection processing between the terminal and network. FIG. 9 is a flowchart based on another optional method of connection processing between the terminal and network of the embodiments of the present invention. As is shown in FIG. 9, the procedure comprises the following steps:

Step S902, the terminal receives the first response message transmitted by the base station indicating the base station establishing or resuming connection with the terminal;

Step S904, the terminal determines the mode with which to implement radio resource configuration based on the radio resource indication carried in the first response message.

Alternatively, in Step S904, when the first response message does not comprise a radio resource configuration indication and comprises an empty radio resource configuration, the terminal uses the locally stored radio resource configuration; or, when the first response message does not comprise a radio resource configuration indication and does not comprise an empty radio resource configuration, the terminal uses a radio resource configuration generated based on the locally stored radio resource configuration and/or the radio resource configuration contained in the first response message.

Embodiment 4

Figure 10:
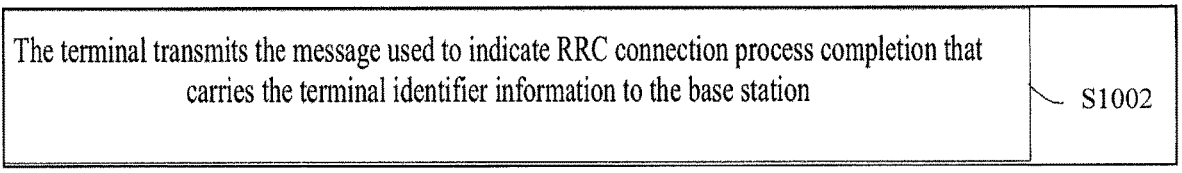
FIG. 10 is a flowchart based on another optional method of connection processing between the terminal and network of the embodiments of the present invention.

The present embodiment provides a method for connection processing between the terminal and network. FIG. 10 is a flowchart based on another optional method of connection processing between the terminal and network of the embodiments of the present invention. As FIG. 10 shows, the procedure comprises the following steps:

Step S1002, the terminal transmits a message carrying the terminal identity information that is used to indicate RRC connection process completion to the base station, wherein, the terminal identity information is used to indicate the identity of the terminal;

Alternatively, the terminal identity information can comprise: the terminal identity or information used to generate the terminal identity.

Alternatively, the terminal identity can, but is not limited to, comprise: identity information with length not exceeding 41 bits; information used to generate the terminal identity can, but is not limited to, comprise at least one of the following: SAE-Temporary Mobile Subscriber Identity, Mobile Management Entity (MME) code MMEC, MME user unique identity number m-TMSI, cell identity, physical cell identity, unique terminal identity number C-RNTI, ShortMAC-I information, a random number with length not exceeding 32 bits.

Alternatively, before Step S1002, the terminal can receive the second response message transmitted by the base station indicating the base station establishing or resuming connection with the terminal, and can determine whether to transmit the message indicating RRC connection process completion to the base station based on the second response message indication.

Alternatively, when the second response message explicitly comprises an instruction indicating whether to transmit the message used to indicate RRC connection process completion, the terminal determines whether to transmit the message used to indicate RRC connection process completion to the base station based on the instruction.

Alternatively, when the second response message does not explicitly comprise an instruction indicating whether to transmit the message used to indicate RRC connection process completion and the second response message comprises an empty radio resource configuration, the terminal does not transmit the message used to indicate RRC connection process completion to the base station; or, when the second response message does not explicitly comprise an instruction indicating whether to transmit the message used to indicate RRC connection process completion and the second response message comprises a non-empty radio resource configuration, the terminal transmits the message used to indicate RRC connection process completion to the base station.

Alternatively, when the second response message does not explicitly comprise an instruction indicating whether to transmit the message used to indicate RRC connection process completion and the second response message comprises a non-empty radio resource configuration, the message used to indicate RRC connection process completion carries the processing result of the terminal toward the radio resource configuration comprising the response message.

Figure 11:
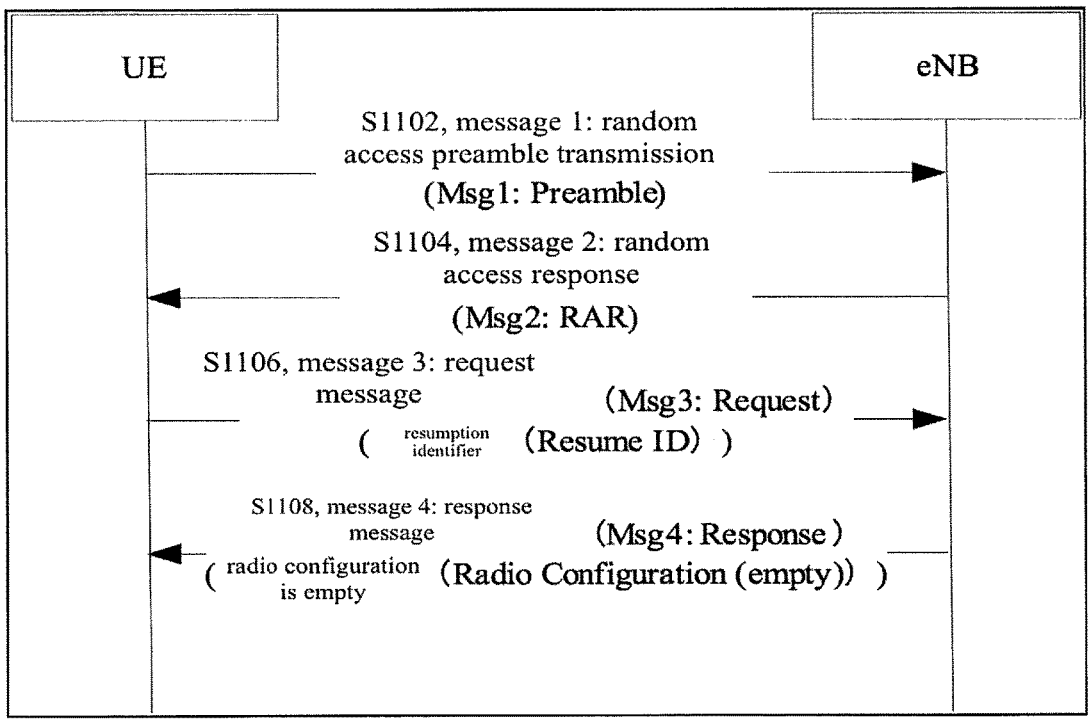
FIG. 11 is another flowchart of a method for connection processing between the terminal and network based on an alternate embodiment of the present invention.

The following describes the connection processing flow of the present embodiment based on an optional mode of implementation. FIG. 11 is another flowchart of a method for connection processing between the terminal and network based on an alternate embodiment of the present invention. As is shown in FIG. 11, the procedure comprises the following steps:

Step S1102, message 1 is the random access preamble transmission between the terminal and the base station.

Step S1104, the base station transmits message 2 to the terminal: the random access response.

Step S1106, the base station receives the request message carrying the terminal identity information transmitted by the terminal.

Step S1108, the terminal receives the second response message indicating the base station establishing or resuming connection with the terminal transmitted by the base station, and the second response message comprises an empty radio resource configuration.

Figure 12:
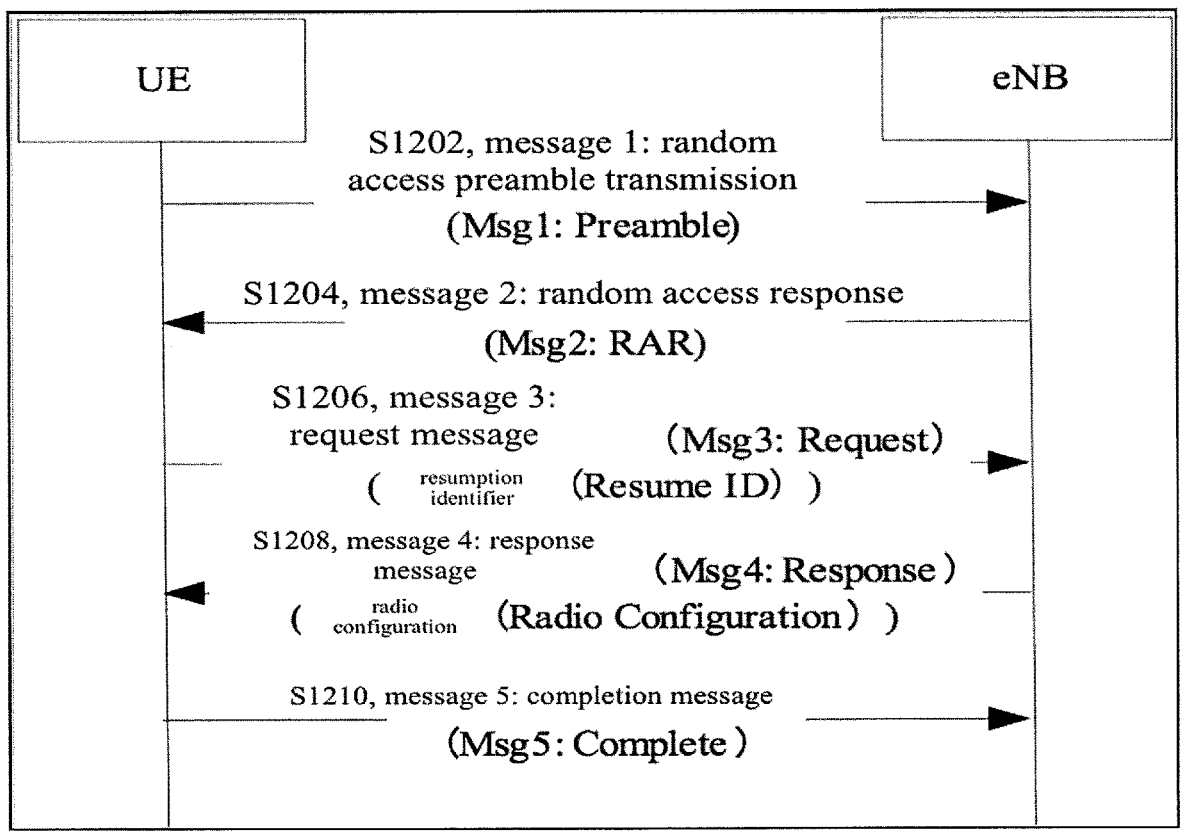
FIG. 12 is another flowchart of a method for connection processing between the terminal and network based on an alternate embodiment of the present invention.

FIG. 12 is another flowchart of a method for connection processing between the terminal and network based on an alternate embodiment of the present invention. As is shown in FIG. 12, the procedure comprises the following steps:

Step S1202, message 1 is the random access preamble transmission between the terminal and the base station.

Step S1204, the base station transmits message 2 to the terminal: the random access response.

Step S1206, the base station receives the request message carrying the terminal identity information transmitted by the terminal.

Step S1208, the terminal receives the second response message indicating the base station establishing or resuming connection with the terminal transmitted by the base station, and the second response message comprises a non-empty radio resource configuration.

Step S1210, the terminal transmits the message used to indicate RRC connection process completion to the base station.

Figure 13:
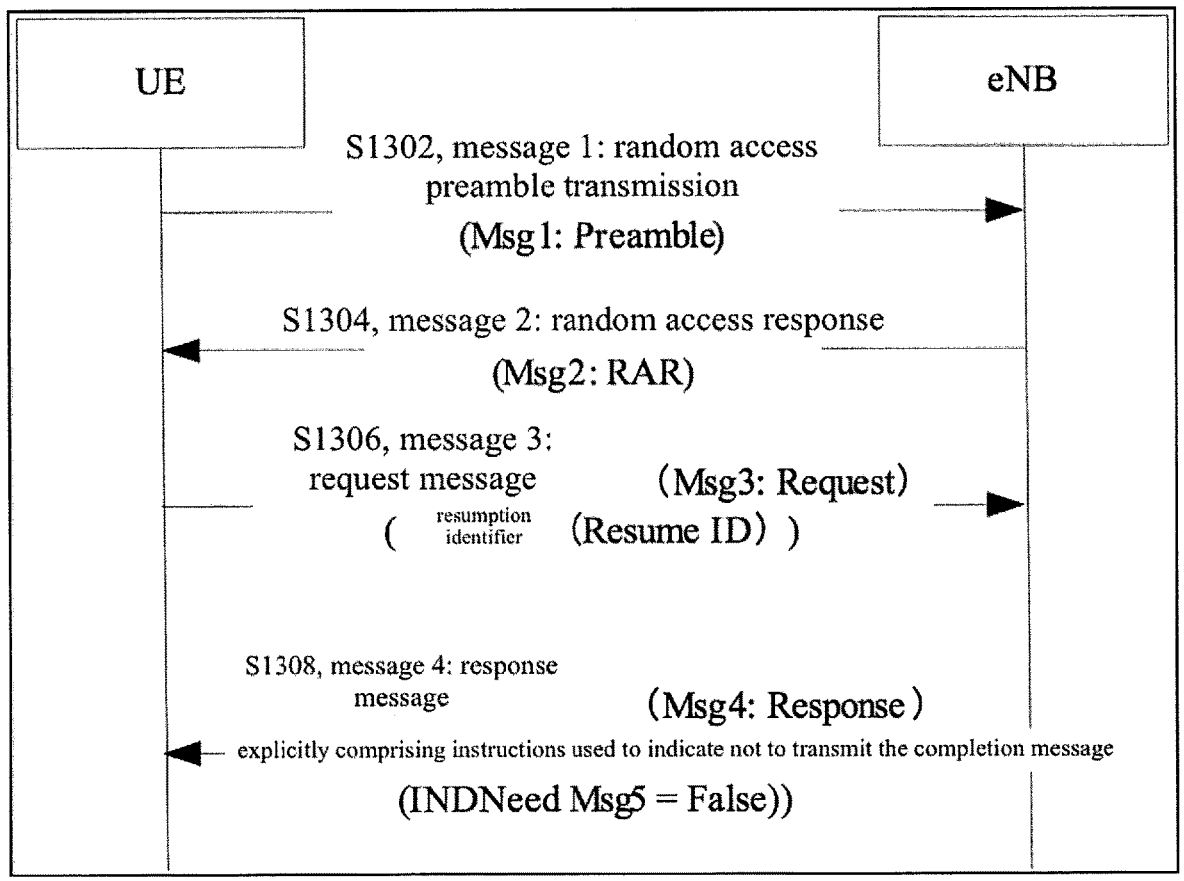
FIG. 13 is another flowchart of a method for connection processing between the terminal and network based on an alternate embodiment of the present invention.

FIG. 13 is another flowchart of a method for connection processing between the terminal and network based on an alternate embodiment of the present invention. As is shown in FIG. 13, the procedure comprises the following steps:

Step S1302, message 1 is the random access preamble transmission between the terminal and the base station.

Step S1304, the base station transmits message 2 to the terminal: the random access response.

Step S1306, the base station receives the request message carrying the terminal identity information transmitted by the terminal.

Step S1308, the terminal receives the second response message indicating the base station establishing or resuming connection with the terminal transmitted by the base station explicitly comprises an instruction used to indicate not to transmit the message used to indicate RRC connection process completion.

Figure 14:
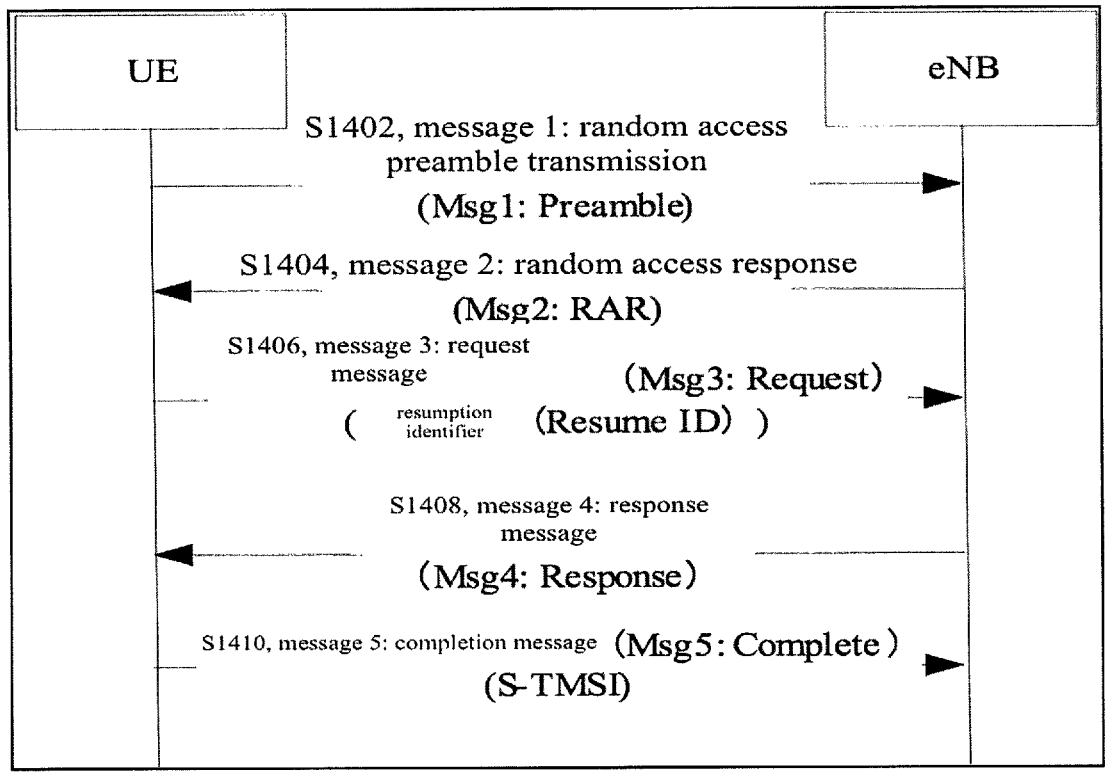
FIG. 14 is another flowchart of a method for connection processing between the terminal and network based on an alternate embodiment of the present invention.

FIG. 14 is another flowchart of a method for connection processing between the terminal and network based on an alternate embodiment of the present invention. As is shown in FIG. 14, the procedure comprises the following steps:

Step S1402, message 1 is the random access preamble transmission between the terminal and the base station.

Step S1404, the base station transmits message 2 to the terminal: the random access response.

Step S1406, the base station receives the request message carrying the terminal identity information transmitted by the terminal.

Step S1408, the second response message received by the terminal that indicates the base station establishing or resuming connection with the terminal transmitted by the base station does not explicitly comprise an instruction indicating whether to transmit the message used to indicate RRC connection process completion, and the second response message comprises a non-empty radio resource configuration.

Step S1410, the terminal transmits the message used to indicate RRC connection process completion to the base station.

Figure 15:
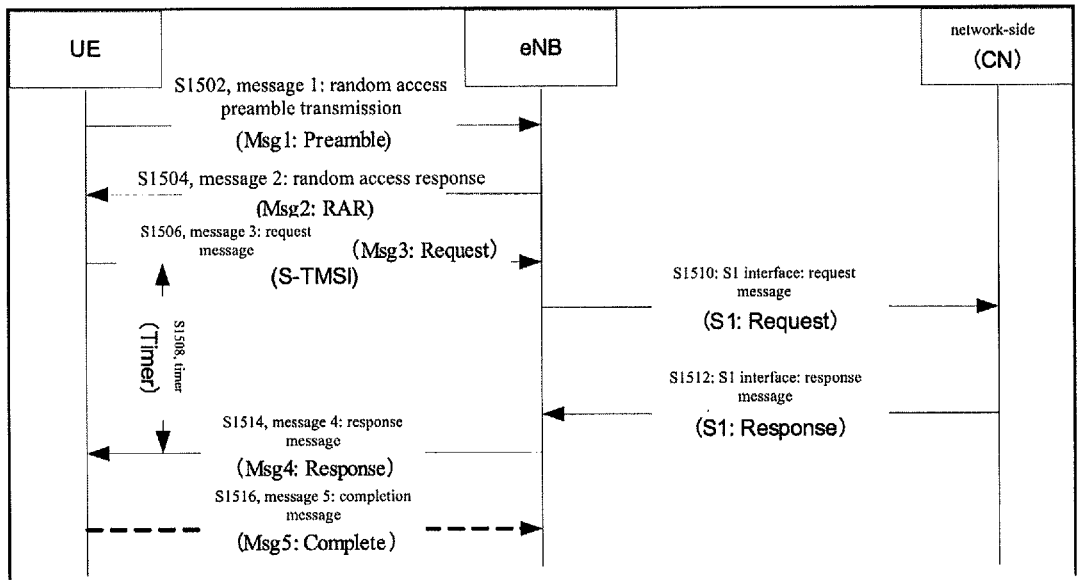
FIG. 15 is another flowchart of a method for connection processing between the terminal and network based on an alternate embodiment of the present invention.

FIG. 15 is another flowchart of a method for connection processing between the terminal and network based on an alternate embodiment of the present invention. As is shown in FIG. 15, the procedure comprises the following steps:

Step S1502, message 1 is the random access preamble transmission between the terminal and the base station.

Step S1504, the base station transmits message 2 to the terminal: the random access response.

Step S1506, the base station receives the request message carrying the terminal identity information transmitted by the terminal.

Step S1508, the second response message received by the terminal that indicates the base station establishing or resuming connection with the terminal transmitted by the base station explicitly comprises an instruction indicating to transmit the message used to indicate RRC connection process completion.

Step S1510, the terminal transmits the message used to indicate RRC connection process completion to the base station.

Embodiment 5

Figure 16:
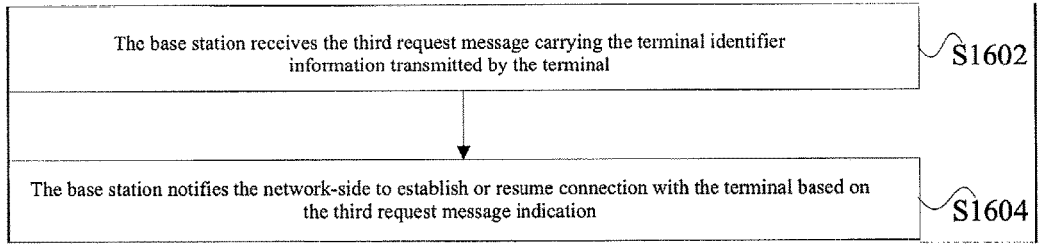
FIG. 16 is a flowchart based on another optional method of connection processing between the terminal and network of the embodiments of the present invention.

The present embodiment provides a method for connection processing between the terminal and network. FIG. 16 is a flowchart based on another optional method of connection processing between the terminal and network of the embodiments of the present invention. As is shown in FIG. 16, the procedure comprises the following steps:

Step S1602, the base station receives the third request message, carrying the terminal identity information, transmitted by the terminal, wherein, the terminal identity information is used to indicate the identity of the terminal, and the third request message is used to request the base station to establish or resume connection between the terminal and network;

Step S1604, the base station notifies the network-side to establish or resume connection with the terminal based on the third request message indication.

Alternatively, terminal identity information can, but is not limited to, comprise at least one of the following: initial terminal identity information, resumption identity information, wherein, initial establishment identity information comprises: initial terminal identity or information used to generate initial terminal identity, and resumption identity information comprises: resumption identity or information used to generate resumption identity.

Alternatively, the initial terminal identity can, but is not limited to, comprise: identity information with length not exceeding 41 bits; information used to generate the initial terminal identity can, but is not limited to, comprise at least one of the following: SAE-Temporary Mobile Subscriber Identity (S-TMSI), Mobile Management Entity (MME) identity MMEC, MME user unique identity code m-TMSI, cell identity, unique terminal identity number C-RNTI, ShortMac-I information, a random number with length not exceeding 32 bits; resumption identity can, but is not limited to, comprise: identity information with length not exceeding 41 bits; information used for resumption identity can, but is not limited to, comprise at least one of the following: SAE-Temporary Mobile Subscriber Identity (S-TMSI), Mobile Management Entity (MME) identity MMEC, MME user unique identity code m-TMSI, cell identity, unique terminal identity number C-RNTI, ShortMac-I information, a random number with length not exceeding 32 bits.

Alternatively, in Step S1604, the base station can notify the network-side to establish or resume connection with the terminal based on the third request message, and obtain the context information matching the resumption identity information.

Alternatively, the process whereby the base station obtains the context information matching the resumption identity information based on the third request message can be:

the base station searching for context information that matches the resumption identity information; or, the base station searching for context information that matches the resumption identity information from within a neighboring base station.

Alternatively, the third request message can further comprise: a resumption indication, wherein, a resumption indication is used to indicate the resumption of the connection with the base station.

Alternatively, the process whereby the base station obtains context information that matches the resumption identity information based on the third request message can further be: when triggered by a resumption indication or a resumption request message, the base station searches for context information that matches the resumption identity information; or, when triggered by a resumption indication or a resumption request message, the base station searches for context information that matches the resumption identity from within a neighboring base station.

Alternatively, after Step S1604, the base station can receive the third response message used to indicate the network-side establishing or resuming a connection result with the terminal, and when it receives the third response message indicating the network-side has established or resumed connection with the terminal successfully, connection between the base station and the terminal is established or resumed.

Alternatively, after the base station receives the third response message used to indicate the network-side establishing or resuming a connection result with the terminal, the base station could receive a third response message indicating the network-side establishing or resuming connection with the terminal unsuccessfully, but the base station receives the context information that matches the resumption identity information successfully; under these circumstances, the base station can reestablish the connection between the terminal and network.

Alternatively, after notifying the network-side to establish or resume connection with the terminal, the base station can receive a third response message indicating the network-side establishing or resuming connection with the terminal unsuccessfully; in addition, the base station does not receive the context information that matches the resumption identity information successfully; under these circumstances, the base station transmits the reject message to the terminal, wherein, the reject message is used to reject the requested operations of the request message; the reject message carries the rejection cause value.

Alternatively, after the base station transmits the reject message to the terminal, the terminal can disregard the transmission process of the random access preamble and once more transmit the request message carrying the terminal identity information to the base station.

The present embodiment further provides a method for connection processing between the terminal and network, wherein, the method comprises the following steps: the terminal transmitting the third request message, carrying the terminal identity information, to the base station, wherein, the terminal identity information is used to indicate the identity of the terminal, and the third request message is used to request the base station to establish or resume connection between the terminal and network.

Alternatively, after transmitting the third request message carrying the terminal identity information, the terminal can extend the time value of the timer; or, it can extend the time value of the timer based on the base station indication, wherein, the time value is the time the terminal waits for the base station to transmit the response message.

Figure 17:
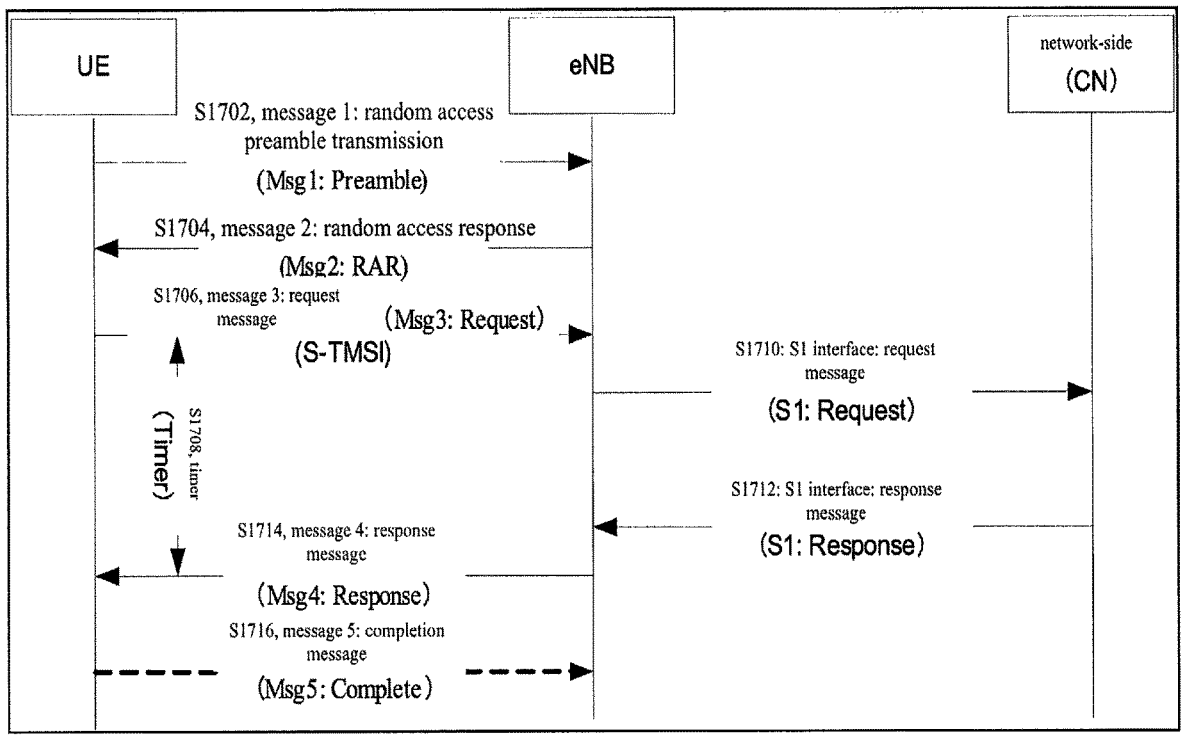
FIG. 17 is another flowchart of a method for connection processing between the terminal and network based on an alternate embodiment of the present invention.

The following describes the connection processing procedure of the present embodiment based on an optional mode of implementation. FIG. 17 is another flowchart of a method for connection processing between the terminal and network based on an alternate embodiment of the present invention. As is shown in FIG. 17, the procedure comprises the following steps:

Step S1702, message 1 is the random access preamble transmission between the terminal and the base station.

Step S1704, the base station transmits message 2 to the terminal: the random access response.

Step S1706, the base station receives the request message carrying the terminal identity information transmitted by the terminal, wherein, the response message carries the initial terminal identity (e.g., S-TMSI).

Step S1708, the terminal extends the time value of the timer.

Step S1710, the base station requests from the network-side a request message resuming S1 interface resources.

Step S1712, the base station receives the response message of resuming S1 interface resources of the network-side.

Step S1714, the base station transmits the third request message carrying terminal identity information to the terminal.

Step S1716, the base station receives the completion message transmitted by the terminal.

Figure 18:
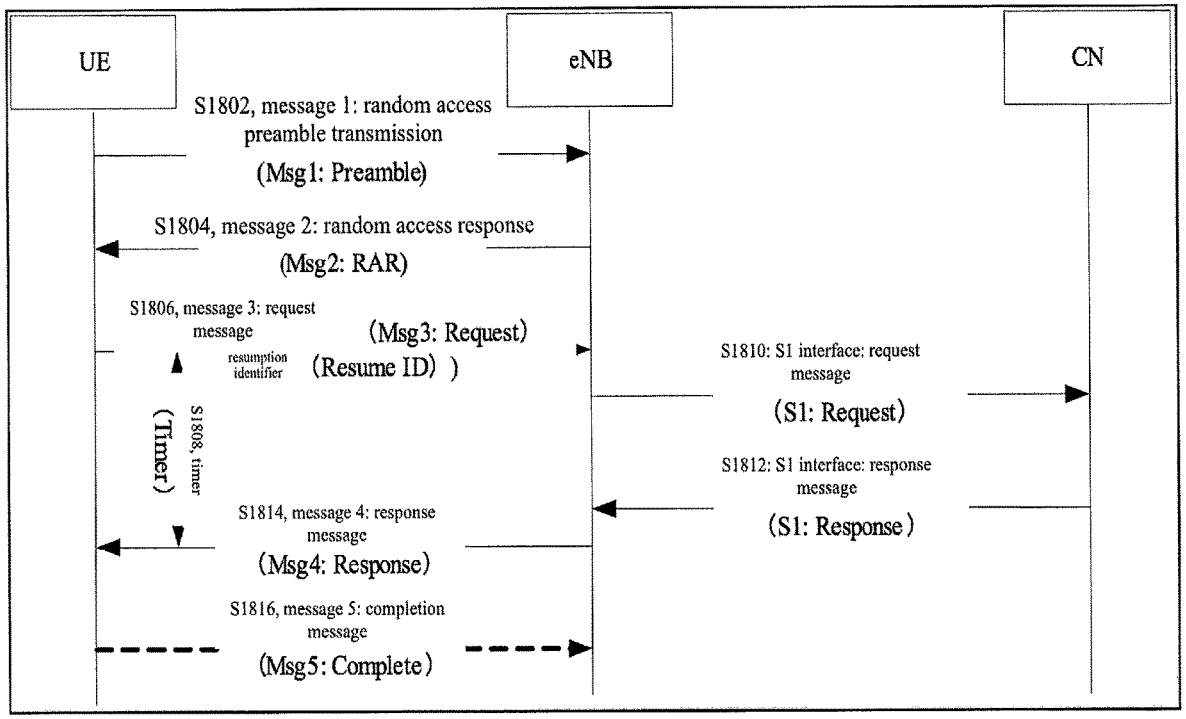
FIG. 18 is another flowchart of a method for connection processing between the terminal and network based on an alternate embodiment of the present invention.

FIG. 18 is another flowchart of a method for connection processing between the terminal and network based on an alternate embodiment of the present invention. As is shown in FIG. 18, the procedure comprises the following steps:

Step S1802, message 1 is the random access preamble transmission between the terminal and the base station.

Step S1804, the base station transmits message 2 to the terminal: the random access response.

Step S1806, the base station receives the request message carrying the terminal identity information transmitted by the terminal, wherein, the request message carries the resumption identity (e.g., Resume ID).

Step S1808, the terminal extends the time value of the timer.

Step S1810, the base station requests from the network-side a request message resuming S1 interface resources.

Step S1812, the base station receives the response message of resuming S1 interface resources of the network-side.

Step S1814, the base station transmits the third request message carrying terminal identity information to the terminal.

Step S1816, the base station receives the completion message transmitted by the terminal.

The base station to successfully resuming or establishing an RRC connection could require that the RRC connection of the air interface and the RRC connection of the network-side are both resumed or established successfully; after the RRC connection with the terminal is resumed or established through the air interface, the network-side must be notified to resume or establish an RRC connection. In some circumstances, the RRC connection could have no way of resumption or establishment because the network-side's resumption is unsuccessful. For example, when the base station cannot find context information matching the terminal identity, the base station can transmit the RRC Connection Reject message to the terminal. A rejection cause can be added to the RRC connection reject message, such as context resumption failure.

In order to make the descriptions of the embodiments of the present invention even more clear, the following combines alternative embodiments for the purpose of explanation.

Within an alternative embodiment, the first response message uses the RRC connection resumption success response as an example.

The present alternative embodiment provides a method for coordinating an RRC connection resumption with an air interface and a network-side procedure in a user plane optimization scenario.

Within the present alternative embodiment, when the base station receives the request message related to the RRC connection resumption procedure transmitted by the terminal (it could be an RRC Connection Request, an RRC Connection Reestablishment Request, a newly added RRC Connection Resumption Request message, or a different message), and when it carries a resumption indication, the base station first triggers the network-side to bear an RRC connection resumption procedure; after receiving the RRC connection resumption success response, the response message related to the RRC connection resumption procedure (it could be an RRC Connection Setup, RRC Connection Reestablishment, a newly added RRC Connection Resumption Response message, or a different message) is then transmitted to the terminal. The base station can directly link the air interface bearer with the core-network bearer in the response message.

Within the present alternative embodiment, when the base station receives the request message related to the RRC connection resumption procedure transmitted by the terminal, and when it carries a resumption indication, if the base station has no way of finding the context information that matches the terminal identity, it can simultaneously trigger the network-side to bear the RR C connection resumption procedure and the X2 interface to bear the RRC connection obtainment procedure. If the base station receives successful responses from both, it can transmit the response message related to the RRC connection resumption procedure (e.g., the RRC Connection Setup, the RRC Connection Reestablishment, a newly added RRC connection resumption response message, or a different message) to the terminal. The base station can directly link the air interface bearer with the core-network bearer in the response message.

Within the present alternative embodiment, if only the network-side bearing the RRC connection resumption procedure is initiated, and it succeeds, or the network-side succeeds in bearing the RRC connection resumption procedure but the X2 interface does not succeed in bearing the RRC connection obtainment procedure, the base station can use the S-TMSI to complete the subsequent connection establishment procedure; within the response message related to the RRC connection resumption procedure transmitted from the base station to the terminal, the air interface bearer and core-network bearer can be directly linked.

Within the present alternative embodiment, if the network-side bears the RRC connection resumption procedure unsuccessfully but the X2 interface bears the RRC connection obtainment procedure successfully, or if both are failures, the base station can transmit the RRC connection resumption reject message (e.g., RRC Connection Reject, to the terminal, RRC Connection Reestablishment Reject, newly added RRC connection resumption reject message, or a different message) to the terminal. A new rejection cause can be added to the RRC connection reject message, such as: network-side or base station-side context resumption failure, etc.

The adoption of the methods of the present embodiments can both perfect the signaling procedure of the user plane optimization mode and rapidly process anomaly circumstances.

Through the descriptions of the above embodiments, it will be apparent to those skilled in the related art that the above methods can be implemented using software and the necessary universal hardware platform, and can also be implemented with hardware, but for many circumstances the former implementation mode is ideal. Based on this understanding, the technical solutions of the present invention themselves, or the portion of which that will contribute to the existing art, can be embodied in the form of computer software products stored on a storage medium (e.g., ROM/RAM, magnetic disks, optical disks), comprising several instructions used to make a terminal device (e.g., a phone, computer, server, or network device, etc.) implement each method of the present embodiment.

Embodiment 6

The present embodiment further provides a terminal and network connection processing apparatus, applicable to the base station; the apparatus is used to implement the foregoing embodiments and optional methods; what has already been explained will not be described further herein. Such as is used below, the term "module" refers to a combination of software and/or hardware used to achieve a preset function. Although the apparatus described by the following embodiments are preferably implemented with software, the use of hardware, or a combination of hardware and software as a means for implementation is also conceivable.

Figure 19:
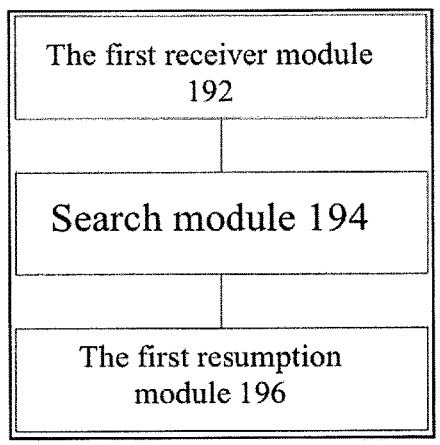
FIG. 19 is a structural block diagram based on an optional terminal-network connection processing apparatus of the embodiments of the present invention.

FIG. 19 is a structural block diagram based on an optional terminal-network connection processing apparatus of the embodiments of the present invention. As is shown in FIG. 19, the apparatus comprises:

1) The first receiver module 192, configured to receive the first request message carrying the terminal identity information transmitted by the terminal, wherein, the terminal identity information is used to indicate the identity of the terminal, and the first request message is used to request the base station to resume the connection between the terminal and network;

2) the search module 194, coupled to the first receiver module 192, configured to search for the context information that matches the terminal identity information;

3) the first resumption module 196, coupled to the search module 194, configured to use the context information to resume the connection with the terminal when the context information has been found.

Alternatively, the terminal identity information can, but is not limited to, comprise at least one of the following: initial terminal identity information, resumption identity information, wherein, initial terminal identity information comprises: initial terminal identity or information used to generate initial terminal identity, and resumption identity information comprises: resumption identity or information used to generate resumption identity.

Alternatively, the apparatus can further comprise: the obtainment module (not illustrated in the drawings), coupled to the search module 194, configured to obtain the context information from the neighboring base station when the context information is not found; the second resumption module, coupled to the obtainment module, configured to use the context information obtained in the neighboring base station to resume the connection with the terminal.

Alternatively, the apparatus further comprises: the first establishment module, coupled to the search module 194, configured to use the terminal identity information to establish a connection with the terminal when the context information is not found.

Alternatively, the first request message can, but is not limited to, comprise one of the following: the resumption request message, a message carrying a connection resumption indication.

Alternatively, a message carrying a connection resumption indication can, but is not limited to, comprise at least one of the following: the Radio Resource Control (RRC) connection request message, and the RRC connection reestablishment request message.

Alternatively, the search module 194 comprises: the search unit, configured to preferentially find the context information that matches the resumption identity information when triggered by the first request message.

Alternatively, the search module 194 comprises: the establishment unit, coupled to the search unit, configured to establish RRC connection with the terminal based on the initial terminal identity information when the context information is not found.

Alternatively, the apparatus further comprises: the fourth transmission module (not illustrated in the drawings), coupled to the search module 194, configured to transmit the reject message to the terminal when the context information is not found, wherein, the reject message carries a reject ion cause value or indication information, wherein, the indication information is used for the terminal to determine whether to reestablish the connection with the network.

Alternatively, the reject message can, but is not limited to, comprise at least one of the following: the RRC connection reject message, the RRC reestablishment reject message, the RRC connection resumption reject message.

Alternatively, the initial terminal identity comprises: identity information with length not exceeding 41 bits; information used to generate the initial terminal identity comprises at least one of the following: SAE-Temporary Mobile Subscriber Identity S-TMSI, Mobile Management Entity (MME) identity MMEC, MME user unique identity code m-TMSI, cell identity, unique terminal identity number C-RNTI, ShortMac-I information, a random number with length not exceeding 32 bits; resumption identity comprises: identity information with length not exceeding 41 bits; information used for the resumption identity comprises at least one of the following: SAE-Temporary Mobile Subscriber Identity S-TMSI, Mobile Management Entity (MME) identity MMEC, MME user unique identity code m-TMSI, cell identity, unique terminal identity number C-RNTI, ShortMac-I information, a random number with length not exceeding 32 bits.

The present embodiment further provides a terminal and network connection processing apparatus, applicable to the terminal, wherein the apparatus comprises: the first transmission module, configured to transmit the first request message carrying the terminal identity information to the base station, wherein, the terminal identity information is used to indicate the terminal's identity, the request message is used to request the base station to resume the connection between the terminal and network.

It should be noted that the above modules can be implemented with software or hardware; the latter can be implemented through, but is not limited to, the following modes: the modules are all located on the same processor; or, the modules are dispersed across multiple processors.

Embodiment 7

The present embodiment further provides a terminal and network connection processing apparatus, applicable to the base station; the apparatus is used to implement the foregoing embodiments and optional methods; what has already been explained will not be described further herein. Such as is used below, the term "module" refers to a combination of software and/or hardware used to achieve a preset function. Although the apparatus described by the following embodiments are preferably implemented with software, the use of hardware, or a combination of hardware and software as a means for implementation is also conceivable.

Figure 20:
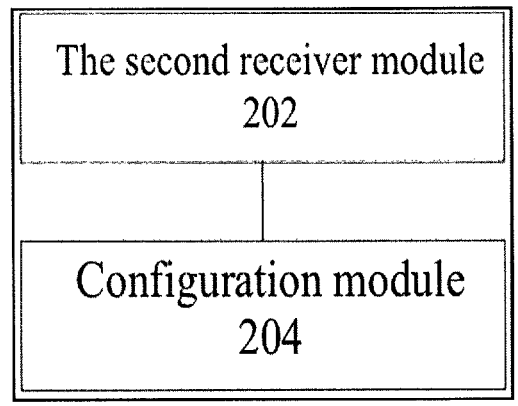
FIG. 20 is a structural block diagram based on another optional terminal-network connection processing apparatus of the embodiments of the present invention.

FIG. 20 is a structural block diagram based on another optional terminal-network connection processing apparatus of the embodiments of the present invention. As is shown in FIG. 20, the apparatus comprises:

1) the second receiver module 202, configured to receive the second request message carrying the data transmission mode information transmitted by the terminal, wherein, the data transmission mode information is used to indicate the terminal's data transmission mode;

2) the configuration module 204, coupled to the second receiver module 202, set up to configure the resources for the connection between the terminal and network based on the data transmission mode information.

Alternatively, the data transmission mode information can, but is not limited to, comprise at least one of the following: the user plane optimization mode information, the control plane optimization mode information.

Alternatively, the configuration module 204 is set up to: configure radio resources based on the data transmission mode information; and/or configure network elements based on the data transmission mode information; and/or configure network access resources based on the data transmission mode information.

Alternatively, the configuration module 204 is set up for: the base station configuring a feature of Signaling Radio Bearers for the radio resources of the connection between terminal and network; and/or the base station configuring a feature of Data Radio Bearers for the radio resources of the connection between terminal and network.

Alternatively, features of Signaling Radio Bearers comprise at least one of the following: whether to include the Packet Data Convergence Protocol (PDCP) protocol layer, whether to use the transparent-mode PDCP protocol layer, whether to include the PDCP protocol header, whether to include the PDCP sequence number, whether to include safety information; features of Data Radio Bearers comprise at least one of the following: whether to include the PDCP protocol layer, whether to use the transparent-mode PDCP protocol layer, whether to include the PDCP protocol header, whether to include the PDCP sequence number, whether to include safety information.

Alternatively, the user plane optimization mode information establishes a cause indication through at least one of the following connections: user plane optimization mode initiate-call data, user plane optimization mode initiate-call signaling, user plane optimization mode initiate-call anomaly reporting, user plane optimization receive-call data, user plane optimization mode receive-call signaling, user plane optimization mode receive-call anomaly reporting; data transmission mode information of the control plane optimization mode is indicated by at least one of the following connection establishment reasons: control plane optimization mode initiate-call data, control plane optimization mode initiate-call signaling, control plane optimization mode initiate-call anomaly reporting, control plane optimization mode receive-call data, control plane optimization mode receive-call signaling, control plane optimization mode receive-call anomaly reporting.

Alternatively, the configuration module 204 is configured as: when the data transmission mode information is initiate-call data or receive-call data of the control plane optimization mode, Signaling Radio Bearers configured for the radio resources of the connection between terminal and network do not comprise the PDCP protocol header; the configuration module 204 is configured as: when the data transmission mode information is any information other than the initiate-call data or receive-call data of the control plane optimization mode, Signaling Radio Bearers configured for the radio resources of the connection between terminal and network comprise the PDCP protocol header.

Alternatively, the apparatus further comprises: the notification module (not illustrated in the drawings), coupled to the configuration module 204, configured to notify the terminal of the resources configured for the connection between the network and terminal through a notification message.

The present embodiment further provides a terminal and network connection processing apparatus, applicable to the terminal; the apparatus comprises: the second transmission module, configured to transmit the second request message carrying the data transmission mode information to the base station, wherein, the data transmission mode information is used to indicate the terminal's data transmission mode.

It should be noted that the above modules can be implemented with software or hardware; the latter can be implemented with, but is not limited to, the following modes: the modules are all located on the same processor, or, the modules are dispersed across multiple processors.

Embodiment 8

The present embodiment further provides a terminal and network connection processing apparatus, applicable to the terminal; the apparatus is used to implement the foregoing embodiments and optional methods; what has already been explained will not be described further herein. Such as is used below, the term "module" refers to a combination of software and/or hardware used to achieve a preset function. Although the apparatus described by the following embodiments are preferably implemented with software, the use of hardware, or a combination of hardware and software as a means for implementation is also conceivable.

Figure 21:
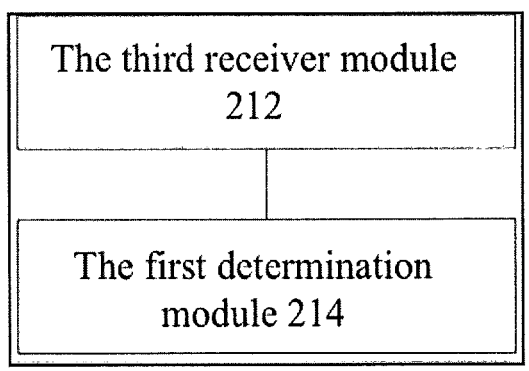
FIG. 21 is a structural block diagram based on another optional terminal-network connection processing apparatus of the embodiments of the present invention.

FIG. 21 is a structural block diagram based on another optional terminal-network connection processing apparatus of the embodiments of the present invention. As is shown in FIG. 21, the apparatus comprises:

1) the third receiver module 212, configured to receive the first response message transmitted by the base station and used to indicate the base station establishing or resuming connection with the terminal;

2) the first determination module 214, coupled to the third receiver module 212, configured to determine the mode with which to execute radio resource configuration based on the radio resource configuration indication carried in the first response message.

Alternatively, the configuration module is configured to: when the first response message does not comprise a radio resource configuration indication and comprises an empty radio resource configuration, it uses the locally stored radio resource configuration; or, when the first response message does not comprise a radio resource configuration indication and does not comprise an empty radio resource configuration, it uses the radio resource configuration generated based on the local stored radio resource configuration and/or the radio resource configuration contained within the first response message.

It should be noted that the above modules can be implemented with software or hardware; the latter can be implemented with, but is not limited to, the following modes: the modules are all located on the same processor, or, the modules are dispersed across multiple processors.

Embodiment 9

The present embodiment further provides a terminal and network connection processing apparatus, applicable to the terminal; the apparatus is used to implement the foregoing embodiments and optional methods; what has already been explained will not be described further herein. Such as is used below, the term "module" refers to a combination of software and/or hardware used to achieve a preset function. Although the apparatus described by the following embodiments are preferably implemented with software, the use of hardware, or a combination of hardware and software as a means for implementation is also conceivable.

Figure 22:
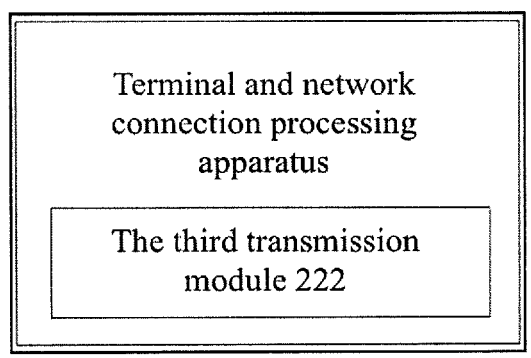
FIG. 22 is a structural block diagram based on another optional terminal-network connection processing apparatus of the embodiments of the present invention.

FIG. 22 is a structural block diagram based on another optional terminal-network connection processing apparatus of the embodiments of the present invention. As is shown in FIG. 22, the apparatus comprises:

1) the third transmission module 222, configured to transmit the message carrying terminal identity information and used to indicate RRC connection process completion to the base station, wherein, the terminal identity information is used to indicate the terminal's identity;

Alternatively, the terminal identity information can, but is not limited to, comprise: the terminal identity or information used to generate the terminal identity.

Alternatively, the terminal identity can, but is not limited to, comprise: identity information with length not exceeding 41 bits; information used to generate the terminal identity comprises at least one of the following: SAE-Temporary Mobile Subscriber Identity, Mobile Management Entity (MME) code MMEC, MME user unique identity number m-TMSI, cell identity, physical cell identity, unique terminal identity number C-RNTI, ShortMAC-I information, a random number with length not exceeding 32 bits.

Alternatively, the apparatus further comprises: the fifth receiver module, configured to receive the second response message indicating the base station establishing or resuming connection with the terminal that is sent by the base station; the second determination module, coupled to be used between the fifth receiver module and the third transmission module, configured to determine whether to transmit the message used to indicate RRC connection process completion to the base station based on the second response message indication.

Alternatively, the second determination module is configured to: when the second response message explicitly comprises instructions used to indicate whether to transmit the message used to indicate RRC connection process completion, it determines whether to transmit the message used to indicate RRC connection process completion to the base station based on the instruction.

Alternatively, the second determination module is configured to: when the second response message does not explicitly comprise an instruction indicating whether to transmit the message used to indicate RRC connection process completion and the second response message comprises an empty radio resource configuration, the terminal does not transmit the message used to indicate RRC connection process completion to the base station; or, when the second response message does not explicitly comprise an instruction indicating whether to transmit the message used to indicate RRC connection process completion and the second response message comprises a non-empty radio resource configuration, the terminal transmits the message used to indicate RRC connection process completion to the base station.

Alternatively, when the second response message does not explicitly comprise an instruction indicating whether to transmit the message used to indicate RRC connection process completion and the second response message comprises a non-empty radio resource configuration, the message used to indicate RRC connection process completion carries the processing result of the terminal toward the radio resource configuration comprising the response message.

It should be noted that the above modules can be implemented with software or hardware; the latter can be implemented with, but is not limited to, the following modes: the modules are all located on the same processor; or, the modules are dispersed across multiple processors.

Embodiment 10

The present embodiment further provides a terminal and network connection processing apparatus, applicable to the base station, the apparatus is used to implement the foregoing embodiments and optional methods; what has already been explained will not be described further herein. Such as is used below, the term "module" refers to a combination of software and/or hardware used to achieve a preset function. Although the apparatus described by the following embodiments are preferably implemented with software, the use of hardware, or a combination of hardware and software as a means for implementation is also conceivable.

Figure 23:
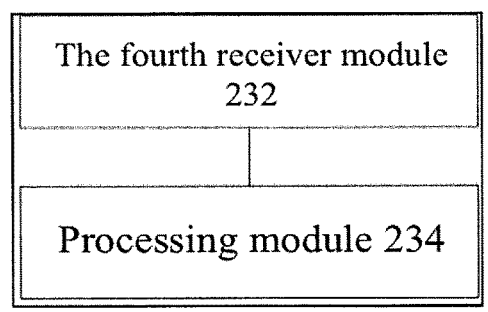
FIG. 23 is a structural block diagram based on another optional terminal-network connection processing apparatus of the embodiments of the present invention.

FIG. 23 is a structural block diagram based on another optional terminal-network connection processing apparatus of the embodiments of the present invention. As is shown in FIG. 23, the apparatus comprises:

1) the fourth receiver module 232, configured to receive the third request message, carrying the terminal identity information, transmitted by the terminal, wherein, the terminal identity information is used to indicate the terminal's identity, and the third request message is used to request the base station to establish or resume the connection between the terminal and network;

2) the processing module 234, coupled to the fourth receiver module 232, configured to notify the network-side to establish or resume connection with the terminal based on the third request message indication.

Alternatively, terminal identity information can, but is not limited to, comprise at least one of the following: initial terminal identity information, resumption identity information, wherein, initial establishment identity information comprises: initial terminal identity or information used to generate initial terminal identity, and resumption identity information comprises: resumption identity or information used to generate resumption identity.

Alternatively, the initial terminal identity comprises: identity information with length not exceeding 41 bits; information used to generate the initial terminal identity comprises at least one of the following: SAE-Temporary Mobile Subscriber Identity S-TMSI, Mobile Management Entity (MME) identity MMEC, MME user unique identity code m-TMSI, cell identity, unique terminal identity number C-RNTI, ShortMac-I information, a random number with length not exceeding 32 bits; resumption identity comprises: identity information with length not exceeding 41 bits; information used—for the resumption identity comprises at least one of the following: SAE-Temporary Mobile Subscriber Identity S-TMSI, Mobile Management Entity (MME) identity MMEC, MME user unique identity code m-TMSI, cell identity, unique terminal identity number C-RNTI, ShortMac-I information, a random number with length not exceeding 32 bits.

Alternatively, the processing module 234 is configured for: the base station notifying the network-side to establish or resume connection with the terminal based on the third request message and obtaining context information that matches the resumption identity information.

Alternatively, the processing module 234 is configured for: the base station searching for context information that matches the resumption identity information; or, the base station searching for context information that matches the resumption identity information from within a neighboring base station.

Alternatively, the third request message can further comprise: a resumption indication, wherein, the resumption indication is used to indicate the resumption of the connection with the base station.

Alternatively, the processing module 234 is configured to: when triggered by a resumption indication or a resumption request message, the base station searches for context information that matches the resumption identity information; or, when the base station is triggered by a resumption indication or a resumption request message, it searches for context information that matches the resumption identity information from within a neighboring base station.

Alternatively, the apparatus further comprises: the sixth receiver module, coupled to the processing module 234, configured to receive the third response message used to indicate the network-side establishing or resuming a connection result with the terminal; the second establishment module, coupled to the sixth receiver module, configured to establish or resume the connection between base station and terminal when the third response message used to indicate the network-side establishing or resuming connection with the terminal successfully has been received.

Alternatively, the apparatus further comprises: the reestablishment module, coupled to the sixth receiver module, configured to reestablish the connection between terminal and network when the third response message used to indicate the network-side unsuccessfully establishing or resuming a connection with the terminal is received but the context information that matches the resumption identity information has been successfully obtained.

Alternatively, after the base station has notified the network-side to establish or resume connection with the terminal, the apparatus further comprises:

the fifth transmission module, coupled to the processing module 234, configured to transmit the reject message to the terminal when the third response message used to indicate the network-side unsuccessfully establishing or resuming a connection with the terminal is received and the base station obtaining the context information that matches the resumption identity information is also a failure, wherein, the reject message is used to reject the requested operations of the request message; the reject message carries the rejection cause value.

Alternatively, after the base station transmits the reject message to the terminal, the apparatus further comprises: the sixth transmission module, coupled to the fifth transmission module, used to disregard the transmission process of the random access preamble and once more transmit the request message carrying the terminal identity information to the base station.

Alternatively, after the base station receives the third request message, carrying the terminal identity information, transmitted by the terminal, the apparatus further comprises: the extension module, coupled to the fourth receiver module 232, configured to extend the time value of the timer, or, extend the time value of the timer based on the base station indication; wherein, the time value is the time the terminal waits for the base station to transmit the response message.

It should be noted that the above modules can be implemented with software or hardware; the latter can be implemented with, but is not limited to, the following modes: the modules are all located on the same processor; or, the modules are dispersed across multiple processors.

Embodiment 11

The present embodiment provides a method for connection processing between the terminal and network, wherein, the method comprises: radio bearers using simplified PDCP functions prior to the establishment of AS layer security.

Alternatively, Radio Bearers comprise: Signaling Radio Bearers (SRB), or Data Radio Bearers (DRB).

Alternatively, Radio Bearers using simplified PDCP functions comprises at least one of the following: Radio Bearers using the transparent-mode PDCP protocol layer, Radio Bearers not containing the PDCP protocol header, Radio Bearers not containing the PDCP sequence number.

Alternatively, the method further comprises: before the AS layer security is established, the terminal can use Radio Bearers of simplified PDCP functions; or, before the AS layer security is established, the base station can use Radio Bearers of simplified PDCP functions.

Alternatively, determine that Radio Bearers use simplified PDCP functions through at least one of the following: the predefined mode, the preconfigured mode, the terminal and base station negotiation mode, the mode whereby the base station transmits the following messages to the terminal: system messages, dedicated notification messages. Alternatively, the predefined mode can be a predefined mode within the protocol. Alternatively, the foregoing system messages or dedicated notification messages carry instructions used to instruct the Radio Bearers to use simplified PDCP functions.

Embodiment 12

Figure 24:
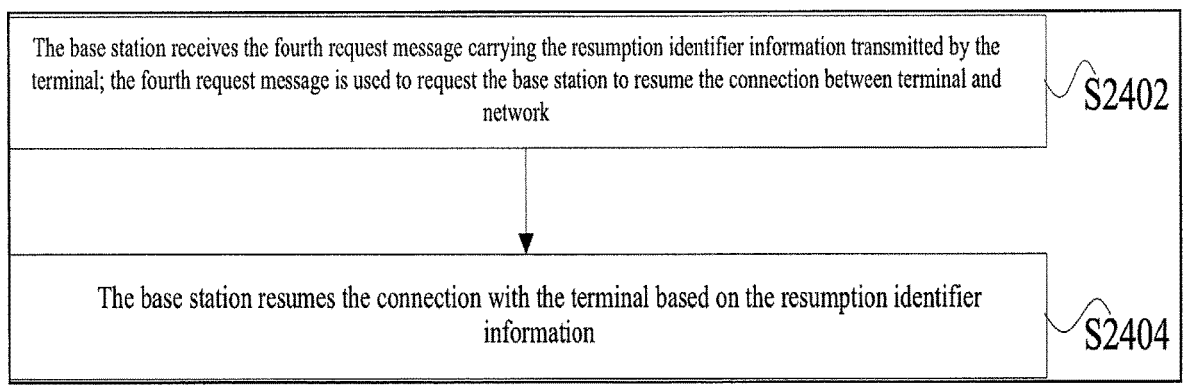
FIG. 24 is a flowchart based on another optional method of connection processing between the terminal and network of the embodiments of the present invention.

The present embodiment provides a method for connection processing between the terminal and network. FIG. 24 is a flowchart based on another optional method of connection processing between the terminal and network of the embodiments of the present invention. As is shown in FIG. 24, the procedure comprises the following steps:

Step S2402, the base station receives the fourth request message, carrying the resumption identity information, transmitted by the terminal; the fourth request message is used to request the base station to resume the connection between terminal and network;

Step S2404, the base station resumes connection with the terminal based on the resumption identity information.

Alternatively, before Step S2402, the base station can, but is not limited to, allocate all of, or a portion of, the resumption identity information to the terminal. For example, the base station can, but is not limited to, transmit all of, or a portion of, the resumption identity information to the terminal when context information is suspended; wherein, the base station can allocate all of, or a portion of, the resumption identity information to the terminal using at least one of the following two methods: method 1, the base station transmits all of, or a portion of, the resumption identity information to the terminal through the connection-suspension message when the context information is suspended; method 2, the base station transmits all of or a portion of the resumption identity information to the terminal through the connection-release message when the context information is suspended.

Alternatively, before Step S2402, the base station can, but is not limited to, allocate, to the terminal, resources required for transmission of the fourth request message; wherein, the base station allocating, to the terminal, resources required for transmission of the fourth request message comprises at least one of the following methods: method 1, the base station indicates the resources in a random access response message transmitted to the terminal; method 2, the base station indicates the resources in the channel format information or a Media Access Control package carrying a random access response message transmitted to the terminal.

Alternatively, the fourth request message can, but is not limited to, comprise one of the following: the resumption request message, or a message carrying the resumption identity information.

Alternatively, the message carrying the resumption identity information can, but is not limited to, comprise at least one of the following: the Radio Resource Control (RRC) connection request message, and the RRC connection reestablishment request message.

Alternatively, resumption identity information can, but is not limited to, comprise at least one of the following: the terminal context identity, the global cell identity, the physical cell identity, the base station identity, and the preset bit length value.

Alternatively, the terminal context identity can be, but is not limited to be, a 16 bit value.

Alternatively, the global cell identity can, but is not limited to, comprise at least one of the following: the global cell identity of the cell when the context information is suspended, the global cell identity of the cell storing the terminal context information.

Alternatively, the physical cell identity can, but is not limited to, comprise at least one of the following: the physical cell identity of the cell when the context information is suspended, the physical cell identity of the cell storing the terminal context information.

Alternatively, the base station identity can, but is not limited to, comprise at least one of the following: the base station identity of the base station when the context information is suspended, the base station identity of the base station storing the terminal context information.

Alternatively, the preset bit length value can, but is not limited to, comprise at least one of the following: a set bit length value; a length value between 16 bits and 44 bits.

Embodiment 13

The present embodiment provides a method for connection processing between the terminal and network; the method comprises:

the terminal transmitting the fourth request message carrying the resumption identity information to the base station, wherein, the fourth request message is used to request the base station to resume the connection between terminal and network, wherein the resumption identity information is used to resume the connection between terminal and network.

Alternatively, before the terminal transmits the fourth request message carrying the resumption identity information to the base station, the terminal can obtain all of, or a portion of, the information used to generate the resumption identity information through reading the cell system message; or, the terminal can construct all of, or a portion of, the resumption identity information; or, the terminal can receive all of, or a portion of, the resumption identity information allocated by the base station.

Alternatively, when the terminal obtains all of, or a portion of, the information used to generate the resumption identity information through reading the cell system message, the terminal can obtain the global cell identity through reading the cell system message; and/or, the terminal can obtain the physical cell identity through reading the cell system message; and/or, the terminal can obtain the base station identity through reading the cell system message.

Alternatively, when the terminal receives all of, or a portion of, the resumption identity information allocated by the base station, the terminal can, but is not limited to, receive all of, or a portion of, the resumption identity information allocated by the base station when the context information is suspended.

Alternatively, the method whereby the terminal receives all of, or a portion of, the resumption identity information allocated by the base station when the context information is suspended can comprise: when the context information is suspended, the terminal receiving all of, or a portion of, the resumption identity information allocated by the base station through the connection-suspension message; and/or when the context information is suspended, the terminal receiving all of, or a portion of, the resumption identity information allocated by the base station through the connection-release message Alternatively, before the terminal transmits the fourth request message carrying the resumption identity information to the base station, the terminal can receive the resources required to transmit the fourth request message and allocated by the base station.

Alternatively, the terminal can receive the resources required to transmit the fourth request message and allocated by the base station through the following methods: method 1, the terminal receives the resources indicated by the base station in the random access response message; and/or method 2, the terminal receives the resources indicated by the base station in the channel format information or the MAC package carrying the random access message.

Alternatively, after the terminal receives the resources required to transmit the fourth request message allocated by the base station, the terminal can, but is not limited to, construct the resumption identity information based on the resources.

Alternatively, the terminal constructs different resumption identity information based on differing resource size; the terminal uses the terminal context identity and preset information to construct the resumption identity information; wherein, preset information comprises one of the following: all of, or a portion of; the global cell identity; all of, or a portion of, the physical cell identity; all of, or a portion of, the base station identity.

Alternatively, the preset information can be preconfigured, and can also be obtained by the terminal through the following methods: the terminal can obtain the preset information through reading the cell system message; or, the terminal can construct the preset information; or, the terminal can receive preset information allocated by the base station.

For example: the resources indicated by the base station could be relatively few, or the resource size could be smaller than a threshold, or the resource size could stay within an interval of 1, or the resource format could be one or multiple formats with relatively lesser length, so the terminal could construct relatively shorter resumption identity information, and the terminal could, but is not limited to, use terminal context identity and physical cell identity to construct the resumption identity information.

The resources indicated by the base station could be relatively numerous, or the resource size could be larger than a threshold, or the resource size could stay within an interval of 2, or the resource mode could be one or multiple formats with relatively greater length, so the terminal could construct relatively longer resumption identity information, and the terminal could, but is not limited to, use the terminal context identity and the global cell identity to construct the resumption identity information.

The base station could also have certain limitations on the length of the resumption identity information, so the resumption identity information can be cut; the terminal can, but is not limited to, use terminal context identity and a truncated global cell identity to construct the resumption identity information.

For example: the resumption identity information constructed by the terminal can take, but is not limited to take, one of the following forms:

1, the resumption identity information=16 bit terminal context identity+9 bit physical cell identity;

2, the resumption identity information=16 bit terminal context identity+28 bit global cell identity;

3, the resumption identity information=16 bit terminal context identity+24 bit truncated global cell identity.

Alternatively, the fourth request message can, but is not limited to, comprise one of the following: the resumption request message, or a message carrying the resumption identity information.

Alternatively, a message carrying the resumption identity information can, but is not limited to, comprise at least one of the following: the Radio Resource Control (RRC) connection request message, and the RRC connection reestablishment request message.

Alternatively, resumption identity information can, but is not limited to, comprise at least one of the following: the terminal context identity, the global cell identity, the physical cell identity, the base station identity, and the preset bit length value.

Alternatively, the terminal context identity can be, but is not limited to be, a 16 bit value.

Alternatively, the global cell identity can, but is not limited to, comprise at least one of the following: the global cell identity of the cell when the context information is suspended, the global cell identity of the cell storing the terminal context information.

Alternatively, the physical cell identity can, but is not limited to, comprise at least one of the following: the physical cell identity of the cell when the context information is suspended, the physical cell identity of the cell storing the terminal context information.

Alternatively, the base station identity can, but is not limited to, at least comprise one of the following: the base station identity of the base station when the context information is suspended, the base station identity of the base station storing the terminal context information.

Alternatively, the preset bit length value can, but is not limited to, comprise at least one of the following: a set bit length value; a length value between 16 bits and 44 bits.

Figure 25:
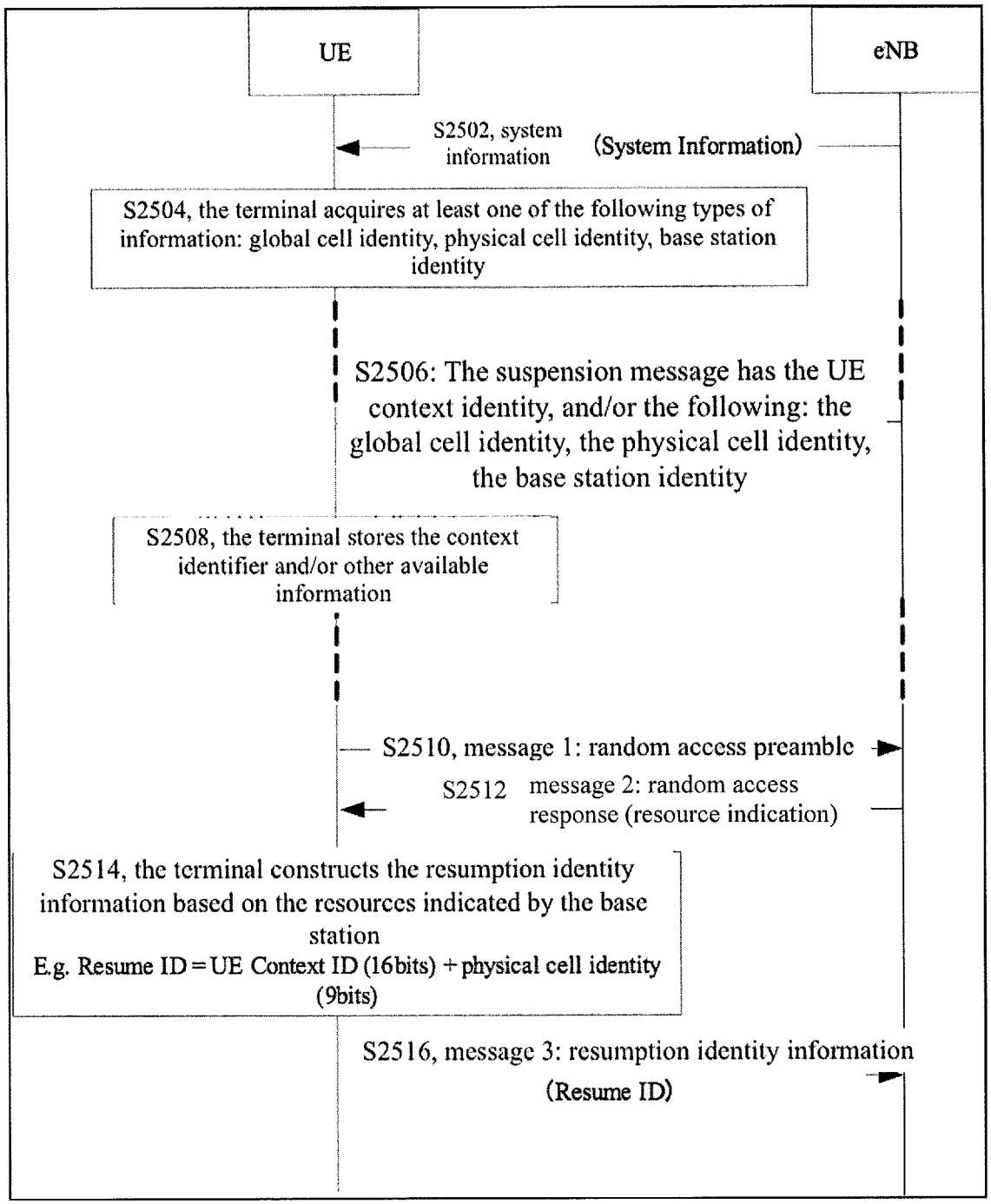
FIG. 25 is another flowchart of a method for connection processing between the terminal and network based on an alternate embodiment of the present invention.

The following describes the connection processing procedure of the present embodiment based on three optional implementation modes. The terminal can construct resumption identity information of varying lengths and formats based on the differing resources indicated by the base station. Within an optional embodiment, the resources indicated by the base station could be relatively few, so the terminal could construct relatively shorter resumption identity information; for example, the terminal could, but is not limited to, use the terminal context identity and the physical cell identity to construct the resumption identity information. As is shown in FIG. 25, a flowchart of the terminal using the terminal context identity and the physical cell identity to construct the resumption identity information, the procedure comprises the following steps:

Step S2502, the terminal receives the system message transmitted by the base station;

Step S2504, the terminal obtains at least one of the following informations based on the system message: the global cell identity, the physical cell identity, the base station identity.

Step S2506, the terminal receives the suspend message transmitted by the base station, wherein, the suspend message carries the UE context information identity, and/or the following informations: the global cell identity, the physical cell identity, the base station identity.

Step S2508, the terminal stores the UE context information identity and/or other available information.

Step S2510, the terminal transmits message 1 to the base station: the random access preamble.

Step S2512, the terminal receives message 2 transmitted by the base station: the random access response.

Step S2514, the terminal constructs the resumption identity information based on the resources indicated by the base station; for example, when the resources indicated by the base station are relatively few or the base station uses a preset format to indicate resources, the terminal could, but is not limited to, use the terminal context identity and a physical cell identity with a relatively lesser length to construct the resumption identity information, that is, the resumption identity information=16 bit terminal context identity+9 bit physical cell identity.

Step S2516, the terminal transmits the fourth request message carrying the resumption identity information to the base station.

Figure 26:
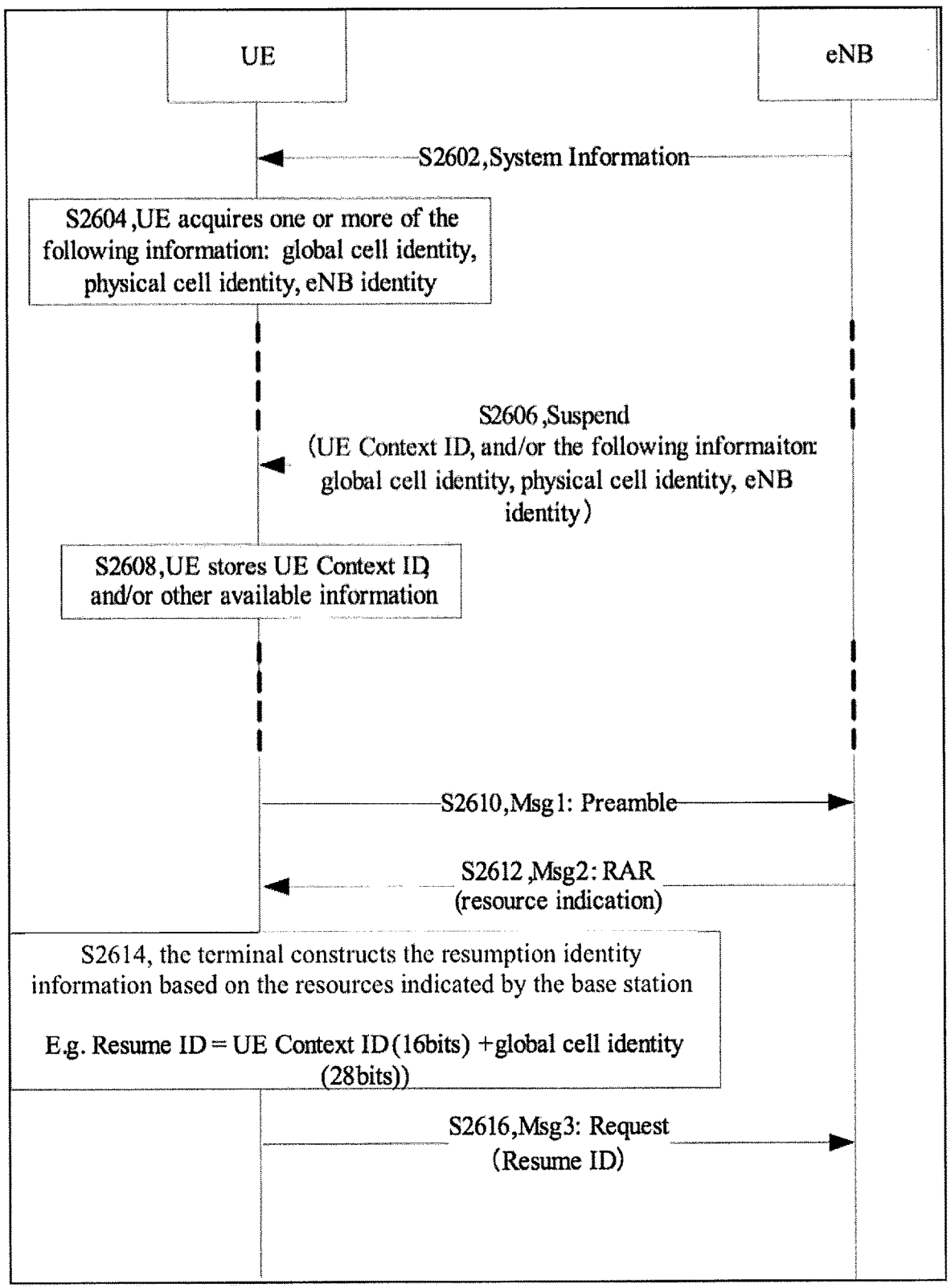
FIG. 26 is another flowchart of a method for connection processing between the terminal and network based on an alternate embodiment of the present invention.

Within another optional embodiment, the resources indicated by the base station could be relatively numerous, so the terminal can construct relatively longer resumption identity information; for example, the terminal could, but is not limited to, use the terminal context identity and the global cell identity to construct the resumption identity information; as is shown in FIG. 26, a flowchart of the terminal using the terminal context identity and the global cell identity to construct the resumption identity information, the procedure comprises the following steps:

Step S2602, the terminal receives the system message transmitted by the base station;

Step S2604, the terminal obtains at least one of the following informations based on the system message: the global cell identity, the physical cell identity, the base station identity.

Step S2606, the terminal receives the suspend message transmitted by the base station, wherein, the suspend message carries the UE context information identity, and/or the following informations: the global cell identity, the physical cell identity, the base station identity.

Step S2608, the terminal stores the UE context information identity and/or other available information.

Step S2610, the terminal transmits message 1 to the base station: the random access preamble.

Step S2612, the terminal receives message 2 transmitted by the base station: the random access response.

Step S2614, the terminal constructs the resumption identity information based on the resources indicated by the base station; for example, when the resources indicated by the base station are relatively numerous or the base station uses a preset format to indicate resources, the terminal could, but is not limited to, use the terminal context identity and a global cell identity with a relatively longer length to construct the resumption identity information; that is, the resumption identity information=16 bit terminal context identity+28 bit global cell identity.

Step S2616, the terminal transmits the fourth request message carrying the resumption identity information to the base station.

Figure 27:
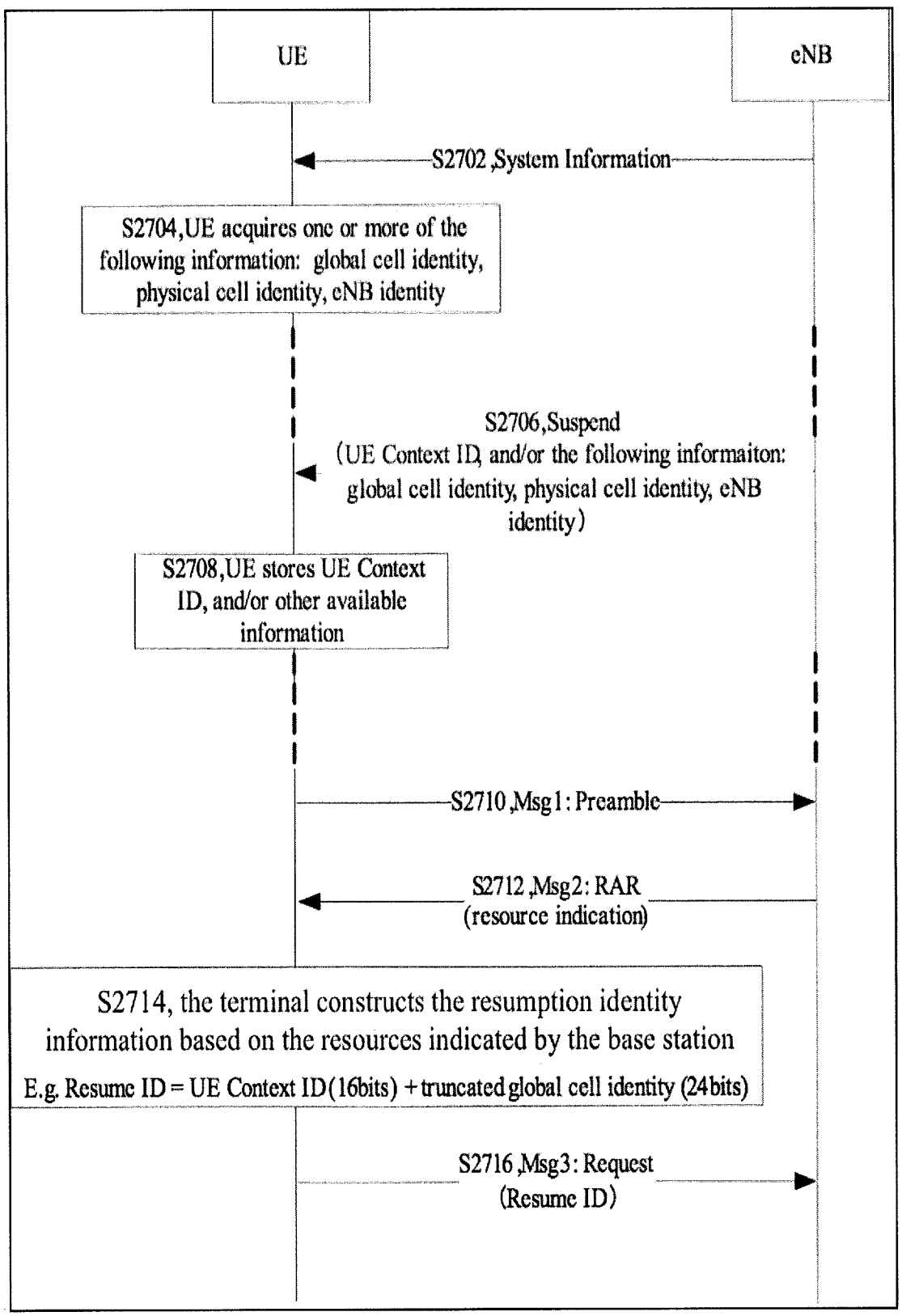
FIG. 27 is another flowchart of a method for connection processing between the terminal and network based on an alternate embodiment of the present invention.

Within another optional embodiment, the resources indicated by the base station could be relatively numerous, so the terminal could construct relatively longer resumption identity information, but could have certain limitations toward the length of the resumption identity information, so the resumption identity information could be cut. For example, the terminal could, but is not limited to, use the terminal context identity and a truncated global cell identity to construct the resumption identity information. As is shown in FIG. 27, a flowchart of the terminal using the terminal context identity and a truncated global cell identity to construct the resumption identity information, the procedure comprises the following steps:

Step S2702, the terminal receives the system message transmitted by the base station;

Step S2704, the terminal obtains at least one of the following informations based on the system message: the global cell identity, the physical cell identity, the base station identity.

Step S2706, the terminal receives the suspend message transmitted by the base station, wherein, the suspend message carries the UE context information identity, and/or the following informations: the global cell identity, the physical cell identity, the base station identity.

Step S2708, the terminal stores the UE context information identity and/or other available information.

Step S2710, the terminal transmits message 1 to the base station: the random access preamble.

Step S2712, the terminal receives message 2 transmitted by the base station: the random access response.

Step S2714, the terminal constructs the resumption identity information based on the resources indicated by the base station, for example: when the resources indicated by the base station are relatively numerous or the base station uses a preset format to indicate resources, the terminal could, but is not limited to, use terminal context identity and a truncated global cell identity to construct the resumption identity information; that is, the resumption identity information=16 bit terminal context identity+24 bit truncated global cell identity.

Step S2716, the terminal transmits the fourth request message carrying the resumption identity information to the base station.

Figure 28:
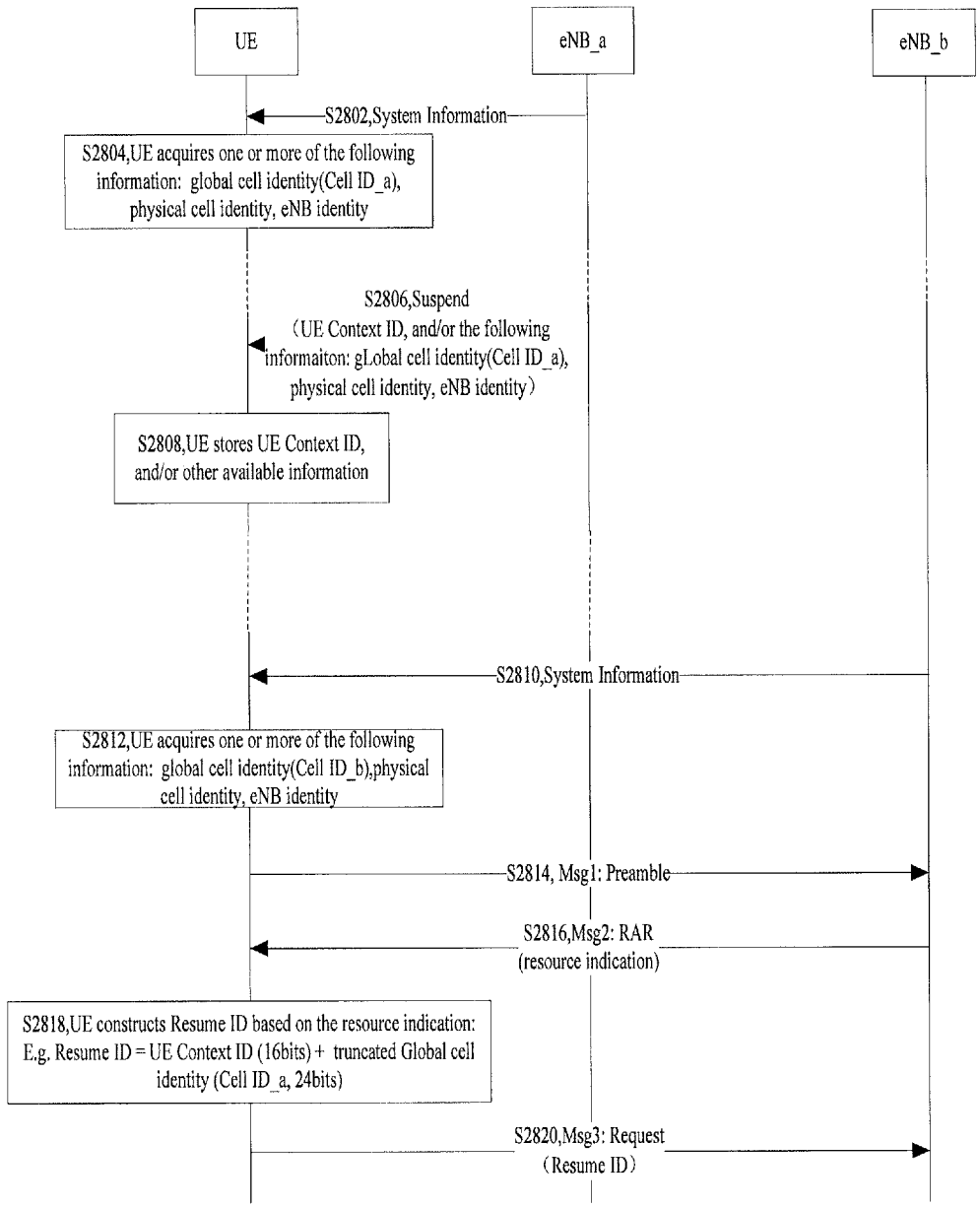
FIG. 28 is another flowchart of a method for connection processing between the terminal and network based on an alternate embodiment of the present invention.

The following describes the connection processing flow of the present embodiment based on an optional mode of implementation. When the terminal suspends the connection with the base station, the terminal can construct the resumption identity information of connection resumption with a different base station based on the information stored in the suspend procedure. The base station can construct resumption identity information with varying lengths or formats based on the differing resources indicated by the base station. As is shown in FIG. 28, a flowchart of the terminal using the terminal context identity and the physical cell identity to construct the resumption identity information, the procedure comprises the following steps:

Step S2802, the terminal receives the system message transmitted by base station (a);

Step S2804, the terminal obtains at least one of the following informations based on the system message: the global cell identity, the physical cell identity, the base station identity.

Step S2806, the terminal receives the suspend message transmitted by base station (a), wherein, the suspend message carries the UE context information identity, and/or the following informations: the global cell identity, the physical cell identity, the base station identity.

Step S2808, the terminal stores the UE context information identity and/or other available information.

Step S2810, the terminal receives the system message received by base station (b).

Step S2812, the terminal obtains at least one of the following informations based on the system message: the global cell identity, the physical cell identity, the base station identity.

Step S2814, the terminal transmits message 1 to base station (b): the random access preamble.

Step S2816, the terminal receives message 2 transmitted by base station (b): the random access response.

Step S2818, the terminal constructs the resumption identity information based on the resources indicated by base station (b); for example: when the resources indicated by base station (b) are relatively numerous or base station (b) uses a preset format to indicate resources, the terminal could, but is not limited to, use terminal context identity and a truncated global cell identity to construct the resumption identity information; that is, the resumption identity information=16 bit terminal context identity+24 bit global cell identity. Here, the terminal obtains the 24 bit global cell identity based on the global cell identity obtained in base station (a).

It should be noted that the resumption identity information of the present optional embodiment can also be composed of the global cell identity or the physical cell identity obtained by the terminal from base station (a) and the terminal context identity, and is not limited herein.

Step S2820, the terminal transmits the fourth request message carrying the resumption identity information to the base station (b).

Embodiment 14

The present embodiment further provides a terminal and network connection processing apparatus, applicable to the base station; the apparatus is used to implement the foregoing embodiments and optional methods; what has already been explained will not be described further herein. Such as is used below, the term "module" refers to a combination of software and/or hardware used to achieve a preset function. Although the apparatus described by the following embodiments are preferably implemented with software, the use of hardware, or a combination of hardware and software as a means for implementation is also conceivable.

Figure 29:
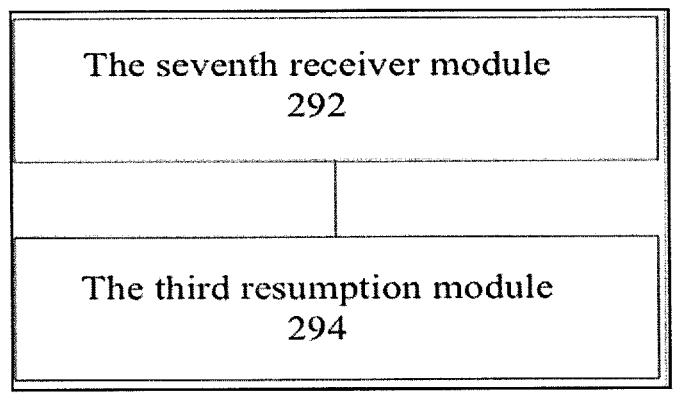
FIG. 29 is a structural block diagram based on another optional terminal-network connection processing apparatus of the embodiments of the present invention.

FIG. 29 is a structural block diagram based on another optional terminal-network connection processing apparatus of the embodiments of the present invention. As is shown in FIG. 29, the apparatus comprises:

1) the seventh receiver module 292, configured to receive the fourth request message carrying the resumption identity information transmitted by the terminal; the fourth request message is used to request the base station to resume the connection between terminal and network;

2) the third resumption module 294, coupled to the seventh receiver module 292, configured to resume connection with the terminal based on the resumption identity information.

Alternatively, the apparatus is further used to: allocate all of, or a portion of, the resumption identity information to the terminal.

Alternatively, the apparatus is further used to: transmit all of, or a portion of, the resumption identity information to the terminal when the context information is suspended.

Alternatively, the apparatus is further configured to: transmit all of, or a portion of, the resumption identity information to the terminal through the connection-suspension message when the context information is suspended; and/or transmit all of, or a portion of, the resumption identity information to the terminal through the connection-release message when the context information is suspended Alternatively, the apparatus is further configured to: allocate, to the terminal, resources required for transmission of the fourth request message.

Alternatively, the apparatus is further configured to: indicate resources in the random access response message transmitted to the terminal; and/or indicate resources in the channel format information or the Media Access Control (MAC) package carrying the random access response message that is transmitted to the terminal.

Alternatively, the fourth request message comprises one of the following: the resumption request message, or a message carrying the resumption identity information.

Alternatively, a message carrying the resumption identity information comprises at least one of the following: the Radio Resource Control (RRC) connection request message, and the RRC connection reestablishment request message.

Alternatively, the resumption identity information comprises at least one of the following: the terminal context identity, the global cell identity, the physical cell identity, the base station identity, and the preset bit length value.

Alternatively, the terminal context identity is a 16 bit value.

Alternatively, the global cell identity comprises at least one of the following: the global cell identity of the cell when the context information is suspended, the global cell identity of the cell storing the terminal context information.

Alternatively, physical cell identity comprises at least one of the following: the physical cell identity of the cell when the context information is suspended, the physical cell identity of the cell storing the terminal context information.

Alternatively, base station identity comprises at least one of the following: the base station identity of the base station when the context information is suspended, the base station identity of the base station storing the terminal context information.

Alternatively, the preset bit length value comprises at least one of the following: a set bit length value; a length value between 16 bits and 44 bits.

Embodiment 15

The present embodiment further provides a terminal and network connection processing apparatus, applicable to the terminal; the apparatus is used to implement the foregoing embodiments and optional methods; what has already been explained will not be described further herein. Such as is used below, the term "module" refers to a combination of software and/or hardware used to achieve a preset function. Although the apparatus described by the following embodiments are preferably implemented with software, the use of hardware, or a combination of hardware and software as a means for implementation is also conceivable. The apparatus comprises: the seventh transmission module, configured to transmit the fourth request message carrying the resumption identity information to the base station, wherein, the fourth request message is configured to request the base station to resume the connection between terminal and network, and the resumption identity information is used to resume the connection between terminal and network.

Alternatively, the apparatus is further configured to: obtain information used to generate all of, or a portion of, the resumption identity information through reading the cell system message; or, the terminal constructs all of, or a portion of, the resumption identity information; or, the terminal receives all of, or a portion of the resumption identity information as allocated by the base station.

Alternatively, the apparatus is further configured to: obtain the global cell identity through reading the cell system message; and/or obtain the physical cell identity through reading the cell system message; and/or obtain the base station identity through reading the cell system message.

Alternatively, the apparatus is further configured to: receive all of, or a portion of, the resumption identity information allocated by the base station when the context information is suspended.

Alternatively, the apparatus is further configured to: receive all of, or a portion of, the resumption identity information allocated by the base station through the connection-suspension message when the context information is suspended; and/or the terminal receive all of, or a portion of, the resumption identity information allocated by the base station through the connection-release message when the context information is suspended.

Alternatively, the apparatus is further configured to: receive the resources required for transmitting the fourth request message allocated by the base station.

Alternatively, the apparatus is further configured to: receive the resource indicated by the base station in the random access response message; and/or the resources indicated by the base station in the channel format information or the MAC package carrying the random access response message.

Alternatively, the apparatus is further configured to: construct the resumption identity information based on the resources.

Alternatively, the terminal constructing the resumption identity information based on the resources comprises:

the terminal constructing different resumption identity information based on differing resource size.

Alternatively, the apparatus is further configured to: use the terminal context identity and preset information to construct the resumption identity information; wherein, preset information comprises one of the following: all of, or a portion of, the global cell identity; all of, or a portion of, the physical cell identity; all of, or a portion of, the base station identity.

Alternatively, the fourth request message comprises one of the following: the resumption request message, or a message carrying the resumption identity information.

Alternatively, a message carrying the resumption identity information comprises at least one of the following: the Radio Resource Control (RRC) connection request message, and the RRC connection reestablishment request message.

Alternatively, resumption identity information comprises at least one of the following: the terminal context identity, the global cell identity, the physical cell identity, the base station identity, and the preset bit length value.

Alternatively, the terminal context identity is a 16 bit value.

Alternatively, the global cell identity comprises at least one of the following: the global cell identity of the cell when the context information is suspended, the global cell identity of the cell storing the terminal context information.

Alternatively, physical cell identity comprises at least one of the following: the physical cell identity of the cell when the context information is suspended, the physical cell identity of the cell storing the terminal context information.

Alternatively, base station identity comprises at least one of the following: the base station identity of the base station when the context information is suspended, the base station identity of the base station storing the terminal context information.

Alternatively, the preset bit length value comprises at least one of the following: a set bit length value; a length value between 16 bits and 44 bits.

Embodiment 16

The present embodiment further provides a type of software used to execute the technical solutions described in the foregoing embodiments and their optional implementation modes.

The present embodiment further provides a storage medium; within the present embodiment, the storage medium can be configured to store program code used to execute the following steps:

S11, the base station receives the first request message carrying the terminal identity information that is transmitted by the terminal, wherein, the terminal identity information is used to indicate the identity of the terminal, and the first request message is used to request the base station to resume the connection between the terminal and network;

S12, the base station searches for context information matching the terminal identity information;

S13, when the base station finds the context information, it uses the context information to resume the connection with the terminal.

Alternatively, the storage medium is further configured to store program code used to execute the following steps:

S21, the terminal transmits the first request message carrying the terminal identity information to the base station, wherein, the terminal identity information is used to indicate the terminal's identity, and the first request message is used to request the base station to resume the connection between the terminal and network.

Alternatively, the storage medium is further configured to store program code used to execute the following steps:

S31, the base station receives the second request message carrying data transmission mode information transmitted by the terminal, wherein, the data transmission mode information is used to indicate the terminal's data transmission mode;

S32, the base station configures resources for the connection between the terminal and network based on the data transmission mode information.

Alternatively, the storage medium is further configured to store program code used to execute the following steps:

S41, the terminal transmits the second request message, carrying data transmission mode information, to the base station, wherein, the data transmission mode information is used to indicate the terminal's data transmission mode.

Alternatively, the storage medium is further configured to store program code used to execute the following steps:

S51, the terminal receives the first response message, used to indicate the base station establishing or resuming connection with the terminal, transmitted by the base station;

S52, based on the radio resource configuration indication carried in the first response message, the terminal determines the mode with which to execute wireless resource configuration.

Alternatively, the storage medium is further configured to store program code used to execute the following steps:

S61, the terminal transmits a message used to indicate Radio Resource Control (RRC) connection process completion that carries the terminal identity information to the base station, wherein, the terminal identity information is used to indicate the terminal's identity.

Alternatively, the storage medium is further configured to store program code used to execute the following steps:

S71, the base station receiving the third request message, carrying the terminal identity information, transmitted by the terminal, wherein, the terminal identity information is used to indicate the terminal's identity, and the third request message is used to request the base station to establish or resume the connection between the terminal and network;

S72, based on the third request message indication, the base station notifies the network-side to establish or resume connection with the terminal.

Alternatively, the storage medium is further configured to store program code used to execute the following steps:

S81, the terminal transmits the third request message, carrying the terminal identity information, to the base station, wherein, the terminal identity information is used to indicate the terminal's identity, and the third request message is used to request the base station to establish or resume the connection between the terminal and network.

Alternatively, the storage medium is further configured to store program code used to execute the following steps:

S91, radio bearers use simplified PDCP functions prior to the establishment of AS layer security.

Alternatively, the storage medium is further configured to store program code used to execute the following steps:

S101, the base station receives the fourth request message, carrying the resumption identity information, transmitted by the terminal; the fourth request message is used to request the base station to resume the connection between terminal and network;

S102, the base station resumes connection with the terminal based on the resumption identity information.

Alternatively, the storage medium is further configured to store program code used to execute the following steps:

S111, the terminal transmits the fourth request message carrying the resumption identity information to the base station, wherein, the fourth request message is used to request the base station to resume the connection between terminal and network, and the resumption identity information is used to resume the connection between terminal and network.

Alternatively, within the present embodiment, the storage medium can, but is not limited to, comprise: any medium able to store program code such as USB, Read-Only Memory (ROM), Random Access Memory (RAM), mobile hard disks, magnetic or optical disks, etc.

It will be apparent to those skilled in the related art that the steps and modules of the present invention can be implemented using a universal computing device; they can be concentrated onto a single computing apparatus or can be distributed across a network of multiple computer apparatus. Alternatively, they can be implemented using computer-executable program code, and can thus be stored on a storage medium to be implemented by a computing apparatus. In some circumstances, the steps of the present invention can be implemented in an order different than those described or illustrated herein; they can be separately manufactured into integrated circuit modules, or multiple steps/modules can be manufactured into a single integrated circuit module for implementation. In this way, the present invention is not limited to any specific combination of hardware and software.

What precedes are merely optional embodiments of the present invention, and do not serve to limit its claims. It will be apparent to those skilled in the related art that the present invention can undergo any number of changes and variations, which will all fall within the spirit and principles of the present invention. Any modification, equivalent replacement, improvement, etc., should be included within the protective scope of the present disclosure.

INDUSTRIAL APPLICABILITY

The technical solutions provided by the embodiments of the present invention are applicable to the connection process between the terminal and base station, and adopt the method whereby the base station receives the first request message carrying the terminal's identity information that is transmitted by the terminal, wherein, the terminal identity information is used to indicate the identity of the terminal, the first request message is used to request the base station to resume the connection between the terminal and network, the base station searches for context information matching the terminal identity information; when the base station finds the context information, it uses the context information to resume the connection with the terminal; since the terminal requesting connection resumption could have already established a connection with the base station before, and the base station may have retained the terminal's context information, the request message received by the base station carries a connection request message, which can instruct the base station to preferentially resume the connection with the terminal; the base station searches for whether the context information matching the indicated terminal identity information is present based on the terminal identity information carried in the request message; if the context information is found, the base station directly resumes connection with the terminal based on context information, thereby solving the problem of complex connection processing between the terminal and base station in the related art, and achieving high-speed connection resumption between the terminal and network. Beyond this, the base station makes use of the original context information, thereby avoiding the repeat execution of a connection establishment flow and improving the efficiency of connection processing between the terminal and network.

The invention claimed is:

1. A method performed by a wireless communication device, comprising:
 receiving a first message from a wireless communication node, wherein the first message is configured to resume a Radio Resource Control (RRC) connection between the wireless communication device and the wireless communication node in response to a second message transmitted to the wireless communication node, and wherein the second message requests resuming the RRC connection between the wireless communication device and the wireless communication node; and
 transmitting a third message to the wireless communication node, wherein the third message indicates a completion of the RRC connection and comprises a SAE-Temporary Mobile Subscriber Identity (S-TMSI), wherein the S-TMSI indicates an identity of the wireless communication device that is matched with context information associated with the wireless communication device, wherein the context information was stored by the wireless communication device during a previous RRC connection between the wireless communication node and the wireless communication device.

2. The method of claim 1 further comprising: based on receiving the first message in response to transmitting the second message to the wireless communication node, determining to transmit the third message to the wireless communication node.

3. A method performed by a wireless communication node, comprising:
 receiving a first message from a wireless communication device, wherein the first message requests resuming a Radio Resource Control (RRC) connection between the wireless communication node and the wireless communication device;
 transmitting a second message to the wireless communication device in response to the first message, wherein the second message is configured to resume the RRC connection between the wireless communication node and the wireless communication device; and
 receiving a third message from the wireless communication device, wherein the third message indicates a completion of the RRC connection and comprises a System Architecture Evolustion (SAE)-Temporary Mobile Subscriber Identity (S-TMSI), wherein the S-TMSI indicates an identity of the wireless communication device that is matched with context information associated with the wireless communication device, wherein the context information was stored by the wireless communication device during a previous RRC connection between the wireless communication node and the wireless communication device.

4. The method of claim 3 wherein the third message is received in response to transmitting the second message.

5. A method performed by a wireless communication device, comprising:
 receiving a dedicated notification message from a wireless communication node, wherein the dedicated notification message indicates an establishment of Signaling Radio Bearers (SRBs) using a Packet Data Convergence Protocol (PDCP) layer in a transparent mode; and
 establishing the SRBs using the PDCP layer in a transparent mode prior to an establishment of Access Stratum (AS) security.

6. A method performed by a wireless communication node, comprising:
 transmitting a dedicated notification message to a wireless communication device, wherein the dedicated notification message indicates an establishment of Signaling Radio Bearers (SRBs) using a Packet Data Convergence Protocol (PDCP) layer in a transparent mode; and
 establishing the SRBs using the PDCP layer in a transparent mode prior to an establishment of Access Stratum (AS) security.

7. A non-transitory computer-readable medium storing computer-executable instructions that when executed perform any one of the methods of any one of claims 1-6.

8. A wireless communication device, comprising:
 a receiver configured to receive a first message from a wireless communication node, wherein the first message is configured to resume a Radio Resource Control (RRC) connection between the wireless communication device and the wireless communication node in response to a second message transmitted to the wireless communication node, and wherein the second message requests resuming the RRC connection between the wireless communication device and the wireless communication node; and
 a transmitter configured to transmit a third message to the wireless communication node, wherein the third message indicates a completion of the RRC connection and comprises a SAE-Temporary Mobile Subscriber Identity (S-TMSI), wherein the S-TMSI indicates an identity of the wireless communication device that is matched with context information associated with the wireless communication device, wherein the context information was stored by the wireless communication device during a previous RRC connection between the wireless communication node and the wireless communication device.

9. The wireless communication device of claim 8, further comprising:
at least one processor configured to, based on receiving the first message in response to transmitting the second message to the wireless communication node, determine to transmit the third message to the wireless communication node.

10. A wireless communication node, comprising:
a receiver configured to receive a first message from a wireless communication device, wherein the first message requests resuming a Radio Resource Control (RRC) connection between the wireless communication node and the wireless communication device;
a transmitter configured to transmit a second message to the wireless communication device in response to the first message, wherein the second message is configured to resume the RRC connection between the wireless communication node and the wireless communication device; and
wherein the receiver is further configured to receive a third message from the wireless communication device, wherein the third message indicates a completion of the RRC connection and comprises a System Architecture Evolustion (SAE)-Temporary Mobile Subscriber Identity (S-TMSI), wherein the S-TMSI indicates an identity of the wireless communication device that is matched with context information associated with the wireless communication device, wherein the context information was stored by the wireless communication device during a previous RRC connection between the wireless communication node and the wireless communication device.

11. The wireless communication node of claim 10, wherein the third message is received in response to transmitting the second message.

12. A wireless communication device, comprising:
a receiver configured to receive a dedicated notification message from a wireless communication node, wherein the dedicated notification message indicates an establishment of Signaling Radio Bearers (SRBs) using a Packet Data Convergence Protocol (PDCP) layer in a transparent mode; and
at least one processor configured to establish the SRBs using the PDCP layer in a transparent mode prior to an establishment of Access Stratum (AS) security.

13. A wireless communication node, comprising:
a transmitter configured to transmit a dedicated notification message to a wireless communication device, wherein the dedicated notification message indicates an establishment of Signaling Radio Bearers (SRBs) using a Packet Data Convergence Protocol (PDCP) layer in a transparent mode; and
at least one processor configured to establish the SRBs using the PDCP layer in a transparent mode prior to an establishment of Access Stratum (AS) security.

* * * * *